US011461432B2

(12) United States Patent
Tamura et al.

(10) Patent No.: US 11,461,432 B2
(45) Date of Patent: Oct. 4, 2022

(54) SEMICONDUCTOR INTEGRATED CIRCUIT

(71) Applicant: FUJITSU LIMITED, Kawasaki (JP)

(72) Inventors: Hirotaka Tamura, Yokohama (JP); Makiko Konoshima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 16/886,890

(22) Filed: May 29, 2020

(65) Prior Publication Data

US 2020/0401651 A1 Dec. 24, 2020

(30) Foreign Application Priority Data

Jun. 18, 2019 (JP) .............................. JP2019-112547

(51) Int. Cl.
*G06F 17/11* (2006.01)
(52) U.S. Cl.
CPC .................................... *G06F 17/11* (2013.01)
(58) Field of Classification Search
CPC ......... G06F 17/11; G06F 17/10; G06N 5/003; G06Q 10/04
See application file for complete search history.

(56) References Cited

U.S. PATENT DOCUMENTS

| 10,592,816 B1* | 3/2020 | Hsu ......................... G06F 17/11 |
| 2006/0149608 A1* | 7/2006 | Asgari .................... G06N 20/00 |
| | | 703/2 |
| 2018/0075342 A1 | 3/2018 | Tamura et al. |
| 2018/0225256 A1* | 8/2018 | Ronnow ................ G06N 10/00 |
| 2019/0278829 A1 | 9/2019 | Takatsu |

FOREIGN PATENT DOCUMENTS

| JP | 2018-41351 A | 3/2018 |
| JP | 6465231 | 2/2019 |

(Continued)

OTHER PUBLICATIONS

"Penalty Functions" Lecture Notes. Retrieved on [Sep. 22, 2021]. Retrieved from the Internet <https://web.stanford.edu/group/sisl/k12/optimization/MO-unit5-pdfs/5.6penaltyfunctions.pdf> (Year: 2015).*

(Continued)

*Primary Examiner* — Emily E Larocque
*Assistant Examiner* — Carlo Waje
(74) *Attorney, Agent, or Firm* — Fujitsu Patent Center

(57) ABSTRACT

An information processing device includes: a memory configured to hold values of state variables included in an evaluation function presenting energy and a weight value for each set of the state variables; and a processor coupled to the memory and configured to: calculate an energy change value when each of the values of the state variables is set as a next change candidate based on the values of the state variables and the weight value; calculate a total energy change value by adding a penalty value according to an excess amount violating an inequality constraint, to each of the energy change values calculated for the state variables, the excess amount being calculated based on a coupling coefficient and a threshold value; and change any value of the state variables in the memory based on a set temperature value, a random number value, and the total energy change values.

11 Claims, 14 Drawing Sheets

(56) References Cited

FOREIGN PATENT DOCUMENTS

WO  2017/017807 A1  2/2017
WO  2017/056366 A1  4/2017

OTHER PUBLICATIONS

EESR—The Extended European Search Report of European Patent Application No. 20177246.4 dated Nov. 26, 2020.
K. Tanahashi et al., "Application of Ising Machines and a Software Development for Ising Machines", Journal of the Physical Society of Japan, vol. 88, No. 6, XP055749499, ISSN: 0031-9015, DOI:10.7566/JPSJ.88.061010, pp. 061010-1-061010-10, May 20, 2019. cited in EESR mailed on Nov. 26, 2020 for corresponding European Patent Application No. 20177246.4.
S. Tsukamoto et al., "An Accelerator Architecture for Combinatorial Optimization Problems", Fujitsu Scientific & Technical Journal (FSTJ), vol. 53, No. 5, XP055673462, pp. 8-13, Sep. 2017. cited in EESR mailed on Nov. 26, 2020 for corresponding European Patent Application No. 20177246.4.

\* cited by examiner

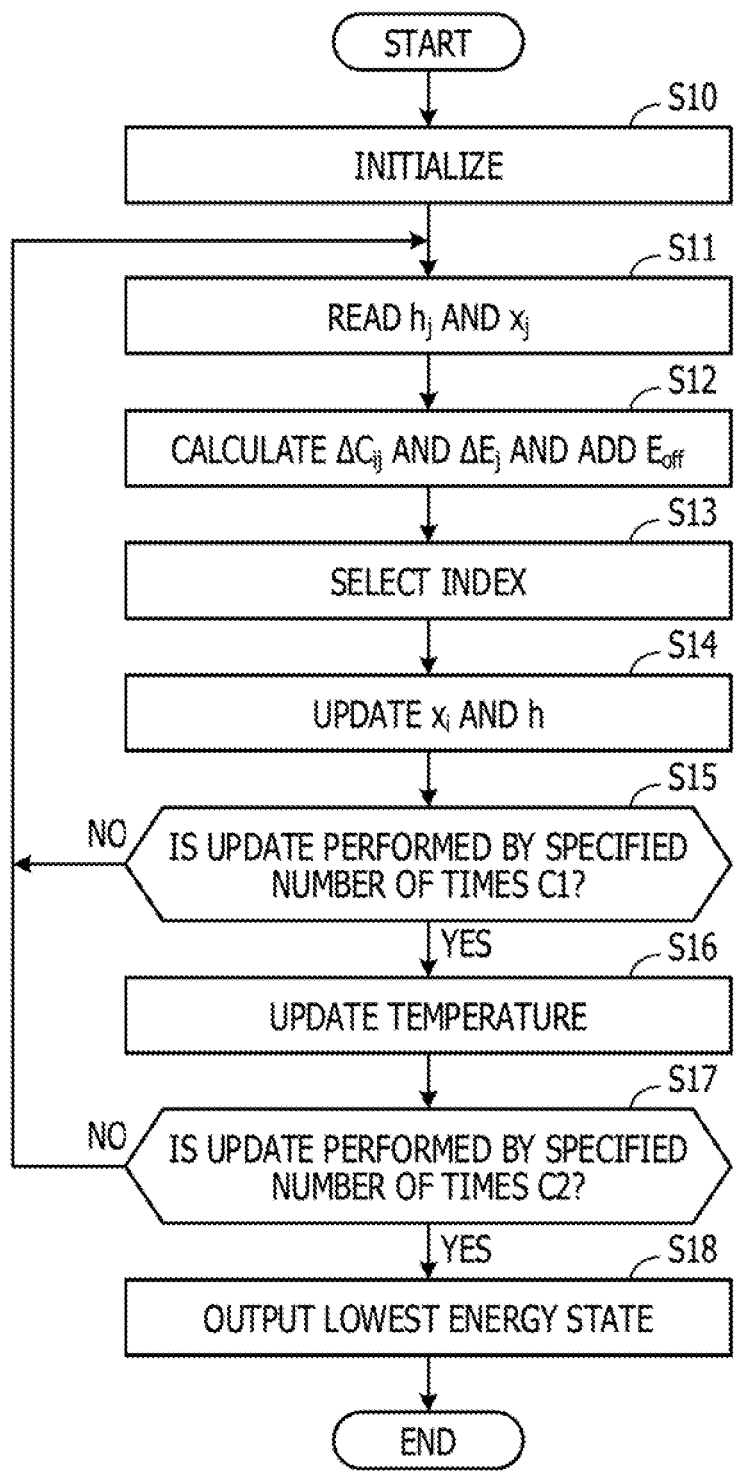

SEMICONDUCTOR INTEGRATED CIRCUIT

CROSS-REFERENCE TO RELATED APPLICATION

This application is based upon and claims the benefit of priority of the prior Japanese Patent Application No. 2019-112547, filed on Jun. 18, 2019, the entire contents of which are incorporated herein by reference.

FIELD

The embodiment is related to an optimization device and an optimization method.

BACKGROUND

As a method of solving an optimization problem of various variables which is not easily handled by a Neumann-type computer, there is an optimization device (also referred to as an Ising machine or a Boltzmann machine) using an Ising-type energy function (also referred to as an evaluation function or an objective function). The optimization device calculates a problem of a calculation target by replacing the problem with an Ising model which is a model representing a behavior of spin of a magnetic material.

Related art is disclosed in Japanese Laid-open Patent Publication No. 2018-41351, International Publication Pamphlet No. WO 2017/017807 and International Publication Pamphlet No. WO 2017/056366.

SUMMARY

According to an aspect of the embodiments, an information processing device includes: a memory configured to hold values of a plurality of state variables included in an evaluation function presenting energy and a weight value for each set of the state variables; and a processor coupled to the memory and configured to: calculate an energy change value when each of the values of the plurality of state variables is set as a next change candidate based on the values of the plurality of state variables and the weight value, in a case where any value of the plurality of state variables changes; calculate a total energy change value by adding a penalty value according to an excess amount violating an inequality constraint, to each of a plurality of the energy change values calculated for the plurality of state variables, the excess amount being calculated based on a coupling coefficient indicating a weight of each of the plurality of state variables in the inequality constraint and a threshold value; and change any value of the plurality of state variables held in the memory based on a set temperature value, a random number value, and a plurality of the total energy change values.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart illustrating an operation example of the optimization device.

DESCRIPTION OF EMBODIMENTS

The optimization device may also be modeled by using, for example, a neural network. In this case, each of a plurality of state variables corresponding to a plurality of spins included in the Ising model functions as a neuron which outputs 0 or 1 according to a value of another state variable and a weight coefficient indicating a magnitude of an interaction between another state variable and its own state variable. The optimization device obtains, as a solution, a combination of values of the respective state variables from which a minimum value of the energy function (hereinafter, referred to as energy) described above, by using a stochastic search method such as simulated annealing.

Here, there is a proposal for an optimization device which calculates a combination of values of each state variable having minimum energy by performing simulated annealing by using, for example, a digital circuit. In addition, there is a proposal for an information processing device including an Ising chip that simulates an interaction between respective spins in the Ising model and an information processing unit that controls the Ising chip.

There is a proposal for an optimization system which derives an optimal solution by reducing a binary quadratic programming problem to a semi-positive definite programming problem, deriving a solution of the semi-positive definite programming problem, and converting the solution of the derived semi-positive definite programming problem into a solution of the binary quadratic programming problem.

An optimization device described above minimizes an evaluation function represented by a quadratic form of a state variable. Meanwhile, in the optimization problem, a constraint condition (inequality constraint) represented by an inequality such as providing an upper limit or a lower limit to a certain amount (for example, a loading amount or a budget) may be imposed. However, it may be difficult to solve the problem of formulating the inequality constraint into the quadratic form of the state variables by the optimization device.

In one aspect, an optimization device and an optimization method which efficiently solve a problem including an inequality constraint may be provided.

Hereinafter, the present embodiments will be described with reference to the drawings.

First Embodiment

A first embodiment will be described.

Figure 1:
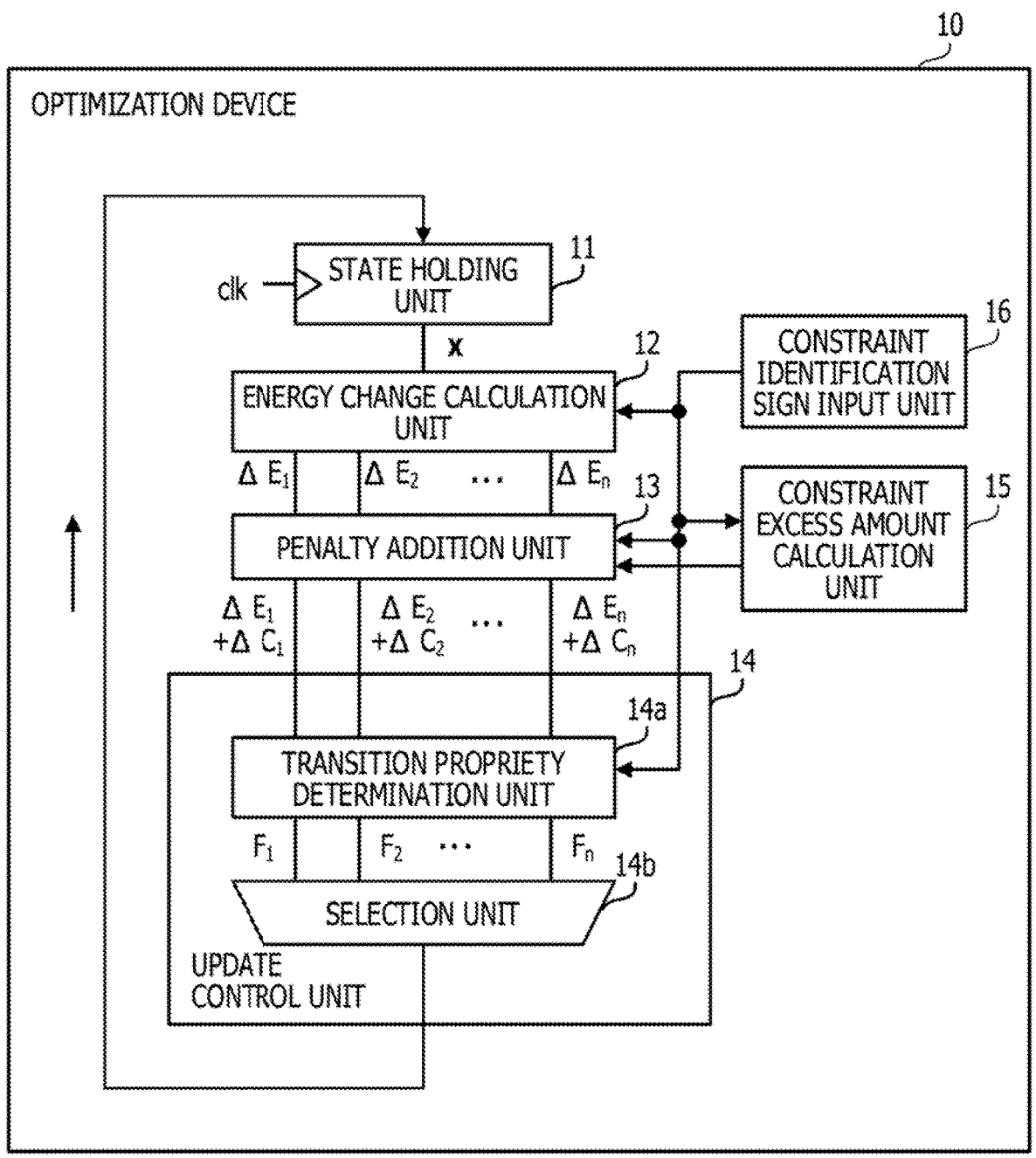
FIG. 1 is a diagram illustrating an optimization device according to a first embodiment.

FIG. 1 is a diagram illustrating an optimization device according to a first embodiment.

An optimization device 10 searches for values (ground state) of each state variable when an energy function is a minimum value, among combinations (states) of respective values of a plurality of state variables corresponding to a plurality of spins included in an Ising model obtained by converting a problem of a calculation target. The state variable may be also referred to as a "binary variable" or a "bit (spin bit)".

When an optimization problem does not include an inequality constraint, the optimization device 10 may perform a search for the ground state based on an energy function $E(x)$ as follows. The Ising-type energy function $E(x)$ is defined by, for example, Equation. 1.

[Equation. 1]

$$E(x) = -\sum_{(i,j)} W_{ij} x_i x_j - \sum_i b_i x_i \quad (1)$$

The optimization problem of a function of a quadratic form of the unconstrained state variable (binary variable) based on Equation. 1 may be referred to as quadratic unconstraint binary optimization (QUBO). In addition, formulation in the quadratic form may also be referred to as a QUBO form.

A first term on the right side of Equation. 1 is obtained by integrating product of values of two state variables and a weight value without omission and duplication for all combinations of two state variables that are selectable from all state variables. $x_i$ is an i-th state variable. $x_j$ is a j-th state variable. A weight value $W_{ij}$ indicates a weight (for example, a strength of coupling) between the i-th state variable and the j-th state variable. For a matrix $W = \{W_{ij}\}$, $W_{ij} = W_{ji}$ and $W_{ii} = 0$ are often satisfied. A subscript i added to a variable, such as the state variable $x_i$, is identification information of the variable and is called an index.

The second term on the right side of Equation. 1 is a sum of products of bias values of all the state variables and values of the state variables. $b_i$ indicates a bias value for an i-th state variable.

For example, a spin "−1" in the Ising model corresponds to a value "0" of the state variable. A spin "+1" in the Ising model corresponds to a value "1" of the state variable.

If a value of a state variable $x_i$ changes to become $1-x_i$, an increase amount of the state variable $x_i$ is represented by $\delta x_i = (1-x_i) - x_i = 1-2x_i$. Therefore, an energy change $\Delta E_i$ accompanying a spin inversion (change in value) of the state variable $x_i$ is expressed by Equation. 2 for the energy function $E(x)$.

[Equation. 2]

$$\begin{aligned}
\Delta E_i &= E(x)|_{x_i \to 1-x_i} - E(x) \\
&= -\delta x_i \left( \sum_j W_{ij} x_j + b_i \right) \\
&= -\delta x_i h_i \\
&= \begin{cases} -h_i & \text{for } x_i = 0 \to 1 \\ +h_i & \text{for } x_i = 1 \to 0 \end{cases}
\end{aligned} \quad (2)$$

$h_i$ is referred to as a local field and is represented by Equation. 3.

[Equation. 3]

$$h_i = \sum_j W_{ij} x_j + b_i \quad (3)$$

A change amount $\beta h_i^{(j)}$ of the local field $h_i$ at the time of change in the state variable $x_j$ (bit inversion) is represented by Equation. 4.

[Equation. 4]

$$\delta h_i^{(j)} = \begin{cases} +W_{ij} & \text{for } x_j = 0 \to 1 \\ -W_{ij} & \text{for } x_j = 1 \to 0 \end{cases} \quad (4)$$

The optimization device 10 includes a register (not illustrated) for storing the local field $h_i$ and adds the change amount $\delta h_i^{(j)}$ to $h_i$ when the value of the state variable $x_j$ changes, thereby, obtaining $h_i$ corresponding to a state after the bit inversion.

The optimization device 10 uses a Metropolis method or a Gibbs method in searching a ground state to determine whether or not to allow a state transition (change in a value of the state variable $x_i$) in which an energy change is $\Delta E_i$. That is, the optimization device 10 stochastically allows not only a state where energy is lowered but also transition to a state where energy is increased in a neighbor search for searching for transition from a certain state to another state where energy is lower than energy of the state. For example, a probability (transition acceptance probability) A that accepts a change in the value of the state variable of the energy change $\Delta E$ is represented by Equation. 5.

[Equation. 5]

$$A(\Delta E) = \begin{cases} \min[1, \exp(-\beta \cdot \Delta E)] & \text{Metropolis} \\ 1/[1 + \exp(\beta \cdot \Delta E)] & \text{Gibbs} \end{cases} \quad (5)$$

Here, $\beta$ is a reciprocal ($\beta = 1/T$) of a temperature T. A min operator indicates that a minimum value of an argument is taken. For example, when using the Metropolis method, Equation. 6 is obtained by taking natural logarithms of both sides for $A = \exp(-\beta \cdot \Delta E)$ of Equation. 5.

[Equation. 6]

$$\ln(A) \times T = -\Delta E \quad (6)$$

Therefore, the optimization device 10 allows a change in a value of the corresponding state variable for a uniform random number u (0<u≤1) when the energy change ΔE satisfies Equation. 7.

[Equation. 7]

$$\ln(t) \times T \leq -\Delta E \quad (7)$$

In addition, the optimization device 10 changes a value of any state variable that is allowed to change. The optimization device 10 repeatedly performs processing of changing the value of the state variable at each temperature while lowering a temperature T from an initial temperature to a lowest temperature, thereby, obtaining a solution to an optimization problem.

An inequality constraint may be added to the optimization problem. Thus, the optimization device 10 provides an operation function for the inequality constraint. The optimization device 10 includes a state holding unit 11, an energy change calculation unit 12, a penalty addition unit 13, an update control unit 14, a constraint excess amount calculation unit 15, and a constraint identification sign input unit 16. The optimization device 10 is realized by using, for example, a semiconductor integrated circuit such as a field-programmable gate array (FPGA). The optimization device 10 may be realized as a semiconductor chip.

The state holding unit 11 holds values of a plurality of state variables included in an evaluation function (energy function E(x) described above) representing energy and a weight value of each set of the state variables. In FIG. 1, the values of the plurality of state variables are represented by a state vector x. For example, the number of the plurality of state variables is n (n is an integer greater than or equal to 2) (that is, the state vector x is n bits).

If any value of a plurality of state variables held in the state holding unit 11 changes, the energy change calculation unit 12 calculates a change value of energy in a case where each of the values of the plurality of state variables is set as a next change candidate based on the values of the plurality of state variables and the weight values. For example, the energy change calculation unit 12 obtains a change value $\Delta E_j$ of the energy in a case where the change candidate is a state variable $x_j$, for each of j=1 to n.

The penalty addition unit 13 calculates a change value ($\Delta E_j + \Delta C_j$) of a total energy by adding a penalty value $\Delta C_j$ according to an excess amount (constraint excess amount) violating an inequality constraint to each of a plurality of energy change values $\Delta E_j$ calculated for the plurality of state variables. The constraint excess amount is a value calculated based on a coupling coefficient indicating a weight of each of the plurality of state variables in the inequality constraint and a threshold value. For example, a change value of the constraint excess amount corresponding to the state variable $x_j$ of the change candidate is calculated by the constraint excess amount calculation unit 15 and supplied to the penalty addition unit 13. The penalty addition unit 13 obtains a penalty value $\Delta C_j$ based on the change value of the constraint excess amount corresponding to the state variable $x_j$, and adds the penalty value $\Delta C_j$ to $\Delta E_j$. For example, the penalty addition unit 13 may calculate the penalty value $\Delta C_j$ by multiplying the change value of the constraint excess amount by a predetermined coefficient representing importance for the inequality constraint.

The update control unit 14 changes any one value of the plurality of state variables held in the state holding unit 11 based on a set temperature value, a random number value, and change values of the plurality of total energies. The update control unit 14 may also determine stochastically whether or not to accept any one of the plurality of state variables by a relative relationship between the change values of the plurality of total energies and thermal excitation energy (thermal noise). The update control unit 14 includes a transition propriety determination unit 14a and a selection unit 14b.

A transition propriety determination unit 14a outputs a flag $F_j$ indicating whether or not to allow a state transition corresponding to a change value ($\Delta E_j + \Delta C_j$) of the total energy based on the temperature value T, a random number value u, and the change value ($\Delta E_j + \Delta C_j$) of the total energy. For example, when the state transition due to a change in the value of the state variable $x_j$ is allowed, $F_j=1$ and when the state transition due to a change in the value of the state variable $x_j$ is not allowed, $F_j=0$. The temperature value T is input to the transition propriety determination unit 14a by a control unit (or a control circuit) not illustrated in the drawing. Here, determination by the transition propriety determination unit 14a is performed based on Equation. 8 in which ΔE of Equation. 7 is replaced with a change value ($\Delta E_j + \Delta C_j$) of the total energy.

[Equation. 8]

$$\ln(u) \times T \leq -(\Delta E + \Delta C) \quad (8)$$

The selection unit 14b selects one state transition number (index) corresponding to $F_j=1$ among $F_j$ (j=1 to n) output by the transition propriety determination unit 14a. The selection unit 14b outputs the selected index to the state holding unit 11, thereby, changing a value of any one of the plurality of state variables held in the state holding unit 11. For example, the state holding unit 11 changes (bit inversion) the value of the state variable corresponding to the index received from the selection unit 14b. By doing so, the value of the state variable held in the state holding unit 11 is updated in synchronization with a clock signal (clk) input to the state holding unit 11.

The constraint excess amount calculation unit 15 calculates a change value of a constraint excess amount when the state variable $x_j$ is set as a change candidate based on a threshold value of the inequality constraint and a coupling coefficient of the state variable $x_j$ for the inequality constraint and supplies the calculated change value to the penalty addition unit 13. The threshold value may be an upper limit value of the inequality constraint or a lower limit value thereof. The threshold value may be both the upper limit value and the lower limit value, and in this case, it may be considered that a larger value among the change values of the constraint excess amount for the upper limit value and the change value of the constraint excess amount for the lower limit value is adopted as the change value of the constraint excess amount violating the inequality constraint.

The constraint identification sign input unit 16 inputs a constraint identification sign to the constraint excess amount calculation unit 15. The constraint identification sign is information designating the upper limit value or the lower limit value used as a threshold value. The constraint identification sign is input to the constraint identification sign input unit 16 by the control unit described above.

In addition, a configuration is considered in which a maximum number of state variables that may be held by the optimization device 10 is set to N (N is an integer greater than n), n of the N variables is used as a normal state variable, and K (K is an integer greater than or equal to 1) is used as a variable (an inequality constraint variable) for representing an inequality constraint. N=n+K. K corresponds to the number of inequality constraints, and if the number of inequality constraints is 1, K=1, and if the number of inequality constraints is 2, K=2.

In this case, the constraint identification sign input unit 16 designates a normal state variable belonging to a state vector and an inequality constraint variable not belonging to the state vector, among the N variables, by means of a constraint identification sign. Therefore, the constraint identification sign input unit 16 may be configured to input the constraint identification sign for the energy change calculation unit 12, the penalty addition unit 13, and the transition propriety determination unit 14a (FIG. 1 illustrates the configuration). By doing so, as will be described below, a penalty value $\Delta C_i$ may be calculated by using the current value of $h_i$ stored in a register storing the local field $h_i$ corresponding to each of the K inequality constraint variables.

When n pieces are used as normal state variables and K pieces are used as inequality constraint variables among N variables, an optimization problem to which the inequality constraint is added may be formulated as follows. Here, a set of indices of the normal state variables is represented by $\Psi$. The number of elements of the set $\Psi$ is n. A set of indices of the inequality constraint variables is represented as $\Omega$ ($\Omega = \{k_1, k_2, \ldots, k_K\}$). The number of elements of the set $\Omega$ is K.

An energy function to be minimized is represented by Equation. 9 as the function E(x) of the n state variables.

[Equation. 9]

$$E(x) = -\sum_{\substack{i,j \in \Psi \\ i<j}} W_{ij} x_i x_j - \sum_{i \in \Psi} b_i x_i \tag{9}$$

The K inequality constraints configured by n state variables are represented by Equation. 10.

[Equation. 10]

$$\begin{cases} h_i = \sum_{j \in \Psi} a_{ij} x_j & (i \in \Omega) \\ C_{li} \leq h_i \leq C_{ui} \end{cases} \tag{10}$$

The coupling coefficient $a_{ij}$ indicates a weight of the state variable $x_j$ ($j \in \Psi$) in the inequality constraint (expressed as the inequality constraint i) corresponding to the index i. $C_{li}$ is the lower limit value of an inequality constraint i. $C_{ui}$ is the upper limit value of the inequality constraint i. However, only one of the lower limit value and the upper limit value may be provided as the inequality constraint.

At this time, an objective function $E_{tot}(x)$ corresponding to the total energy is represented by Equation. 11.

[Equation. 11]

$$E_{tot}(x) = E(x) + C(x) \tag{11}$$

The function C(x) is a sum of products of a constraint excess amount for an inequality constraint and an importance coefficient $\lambda_i$, for all inequality constraints and is represented by Equation. 12.

[Equation. 12]

$$C(x) = \sum_{i \in \Omega} \lambda_i \max[0, h_i - C_{ui}, C_{li} - h_i] \tag{12}$$

Here, the importance coefficient $\lambda_i$ is a real number greater than or equal to 0 and represents importance of the inequality constraint i. In addition, a max operator indicates a maximum value of the arguments. A change value of the function C(x) corresponds to the penalty value.

Figure 2A:
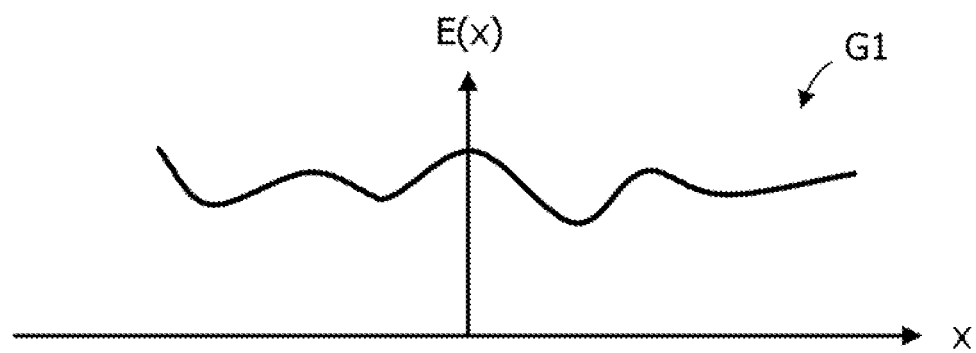
FIGS. 2A and 2B are a diagram illustrating examples of functions E(x) and C(x).
Figure 2B:
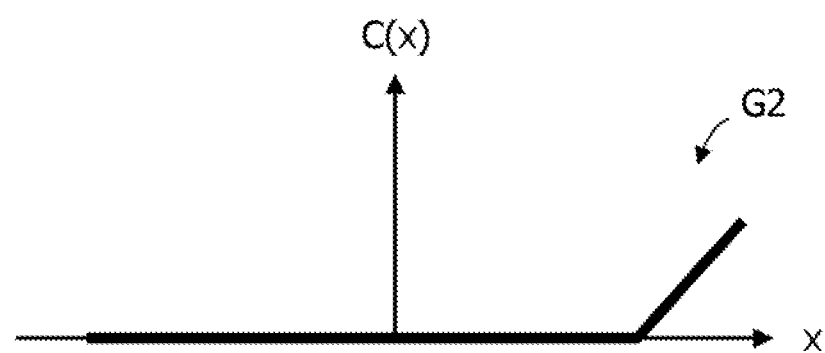

FIGS. 2A and 2B are a diagram illustrating examples of the functions E(x) and C(x).

FIG. 2A illustrates a graph G1 of the example of the function E(x). FIG. 2B illustrates a graph G2 of the example of the function C(x). Horizontal axes of the graphs G1 and G2 indicate a state x (a state represented by a state vector). A vertical axis of the graph G1 is E(x). A vertical axis of the graph G2 is C(x). For the objective function $E_{tot}(x)$ obtained by adding the function C(x) to the function E(x), a state based on, for example, Equation. 8 (Metropolis method) is shifted, and thus, a solution to satisfy (or minimize constraint excess for the inequality constraint) the inequality constraint for the function E(x) is obtained.

Figure 3:
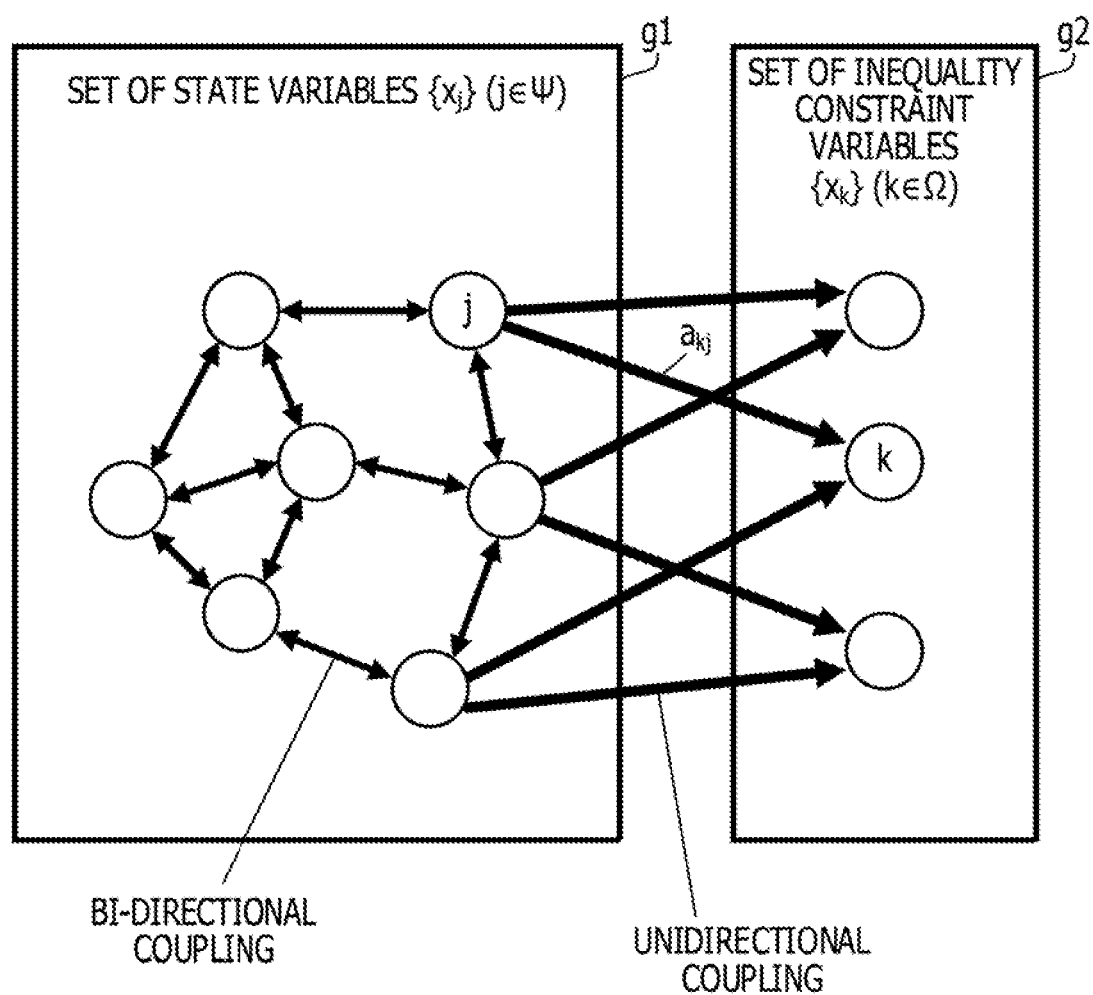
FIG. 3 is a diagram illustrating an example of a relationship between variables.

FIG. 3 is a diagram illustrating an example of a relationship between variables.

A variable group g1 indicates a set $\{x_j\}$ ($j \in \Psi$) of state variables. A variable group g2 indicates a set $\{x_k\}$ ($k \in \Omega$) of the inequality constraint variables.

A pair of state variables is bi-directional coupling. That is, a relationship is established in which a local field of the other state variable of the pair is influenced by inversion of one state variable of the pair.

A pair of the state variable and the inequality constraint variable is unidirectional coupling from the state variable toward the inequality constraint variable. That is, a relationship is established in which the local field of the inequality constraint variable is influenced by the inversion of the state variable, but the local field of the state variable is not influenced by the inversion of the inequality constraint variable. A magnitude (weight) of influence of the state variable $x_j$ on the inequality constraint k is represented by a coupling coefficient $a_{kj}$. The coupling coefficient $a_{kj}$ is given as an element of the matrix W described above. In addition, a bias $b_k$ of the inequality constraint variable is set to $b_k=0$.

In order to implement a relationship between the state variable and the inequality constraint variable, in one example, the optimization device 10 sets a value of the inequality constraint variable $x_k$ to 0 and controls so that the inversion of the inequality constraint variable does not occur, thereby, suppressing the influence of the state variable on the local field. In another example, by setting the coupling coefficient $a_{kj}$ to an asymmetric coupling coefficient (that is, $a_{kj} \neq 0$, $a_{jk}=0$), the influence of the inequality constraint variable $x_k$ on the local field of the state variable may be suppressed. In yet another example, it is possible to control the transition propriety determination unit 14a to output the flag $F_k=0$ to the inequality constraint variable $x_k$ all the time based on the constraint identification sign.

The inequality constraint variable is not coupled to the other inequality constraint variables. That is, $W_{ij}$ and $W_{ji}$ (i, $j \in \Omega$) are set to 0 for the pair of the inequality constraint variables.

The local field $h_k$ of the inequality constraint variable $x_k$ ($k \in \Omega$) is represented by Equation. 13.

[Equation. 13]

$$h_k = \sum_{j \in \Psi} a_{kj} x_j \tag{13}$$

The inequality constraint variable does not influence energy E(x) of the state represented by the normal state variable, but a value of the local field $h_k$ corresponding to the inequality constraint variable $x_k$ is updated to a latest value according to inversion of the normal state variable. In addition, by comparing the local field $h_k$ with upper and lower limits of the inequality constraint, a satisfaction situation of the inequality constraint is obtained.

As represented by Equation. 11, the total energy $E_{tot}(x)$ is a sum of the QUBO term $E(x)$ and the inequality constraint term (penalty term) $C(x)$. The energy change $\Delta E_{tot\,j}(x)$ of the total energy for the inversion of the normal state variable $x_j$ ($j \in \Psi$) is represented by Equation. 14.

[Equation. 14]

$$\Delta E_{tot\,j} = \Delta E_j + \Delta C_j \qquad (14)$$

$\Delta E_j$ is generated based on the QUBO term, for example, by using an existing circuit configuration disclosed in Japanese Laid-open Patent Publication No. 2018-41351.

$\Delta C_j$ is generated based on Equation. 15 by using a current value of the local field $h_i$ of the inequality constraint variable $x_i$ ($i \in \Omega$).

[Equation. 15]

$$\Delta C_j = \sum_{i \in \Omega} \lambda_i \{\max[0, h_i + a_{ij}\delta x_j - C_{ui}, C_{li} - a_{ij}\delta x_j - h_i] - \max[0, h_i - C_{ui}, C_{li} - h_i]\} \qquad (15)$$

$$= \sum_{i \in \Omega} \lambda_i \Delta C_{ij} \quad (j \in \Psi)$$

Here, $\Delta C_{ij}$ is represented by Equation. 16.

[Equation. 16]

$$\Delta C_{ij} = \qquad (16)$$
$$\max[0, h_i + a_{ij}\delta x_j - C_{ui}, C_{li} - a_{ij}\delta x_j - h_i] - \max[0, h_i - C_{ui}, C_{li} - h_i]$$

However, $\delta x_j$ is a change amount of the state variable $x_j$ at the time of inversion of the state variable $x_j$, and is represented by Equation. 17.

[Equation. 17]

$$\delta x_j = (1-x_j) - x_j = 1 - 2x_j \qquad (17)$$

That is, $\Delta C_{ij}$ is a value (change value) of a change amount of a constraint excess amount for the inequality constraint (inequality constraint i) of the index i accompanied by the inversion of the state variable $x_j$. In addition, the penalty value $\Delta C_j$ is a weighted sum, according to the importance coefficient, of the change value of the constraint excess amount for each inequality constraint. When only the upper limit value is given by the inequality constraint i, an argument of "$C_{li} - a_{ij}\delta x_j - h_i$" or an argument of "$C_{li} - h_i$" may not be included in a max operation of Equation. 15 and Equation. 16. In addition, when only the lower limit value is given by the inequality constraint i, an argument of "$h_i + a_{ij}\delta x_j - C_{ui}$" or an argument of "$h_i - C_{ui}$" may not be included in the max operation of Equation. 15 and Equation. 16. When equality constraint is represented as the constraint i, $C_{ui}$ may be equal to $C_{li}$ in Equation. 15 and Equation. 16.

Next, an implementation example of the theory for the optimization device 10 will be further described. In the following, a maximum number of the state variables which may be held by the optimization device 10 is assumed to be set to N. In addition, an index belonging to $\Omega$ may be expressed by a subscript i of $k_i$ such that $k_1$ is 1, $k_2$ is 2, . . . , $k_K$ is K for the sake of convenience.

Figure 4:
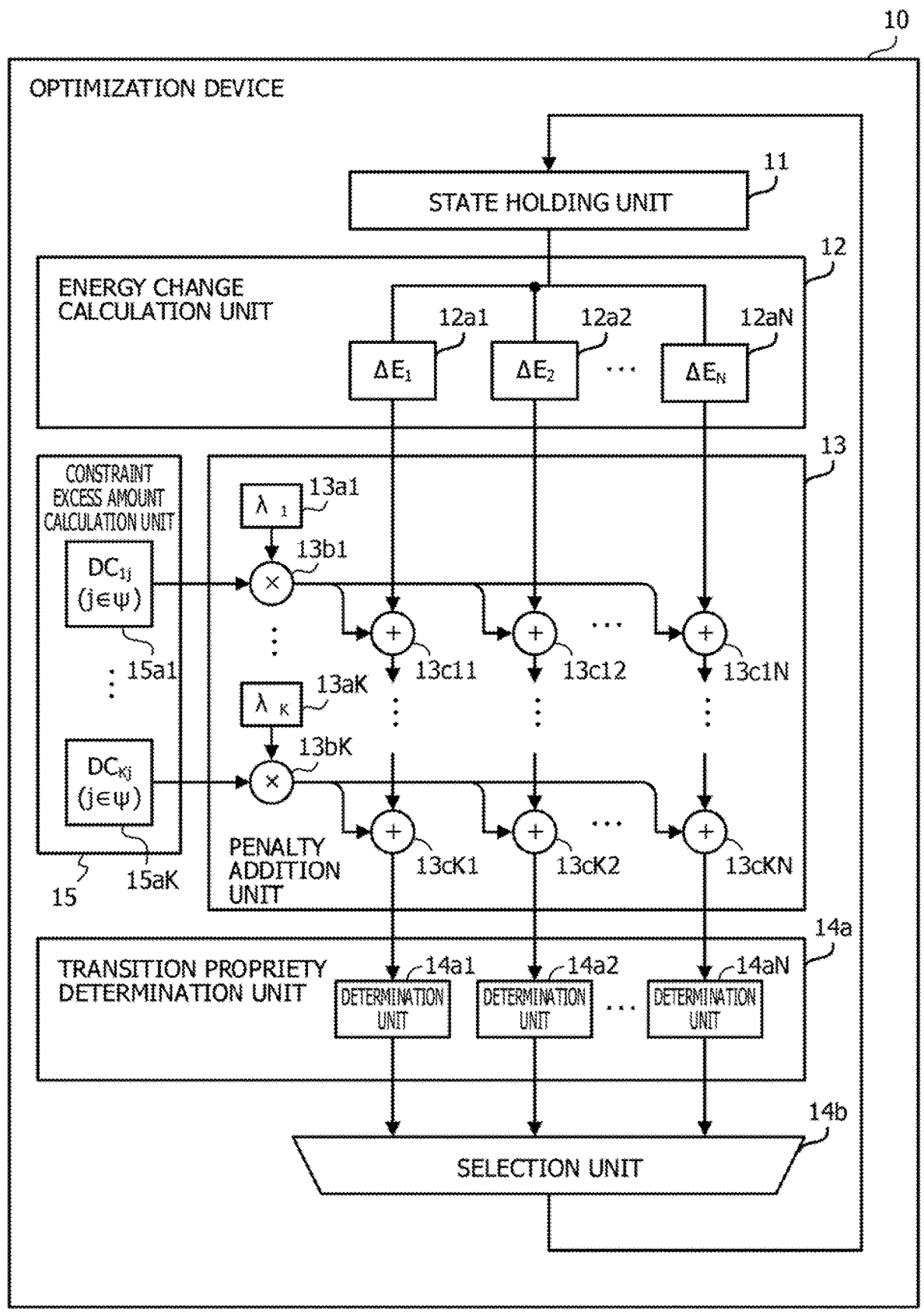
FIG. 4 is a diagram illustrating a circuit configuration example of the optimization device.

FIG. 4 is a diagram illustrating a circuit configuration example of the optimization device.

The energy change calculation unit 12 includes $\Delta E$ calculation units 12a1 to 12aN. Each of the $\Delta E$ calculation units 12a1 to 12aN calculates a change value $\Delta E_j$ of energy when a j-th state variable supplied from the state holding unit 11 is set as an inversion candidate, based on Equation. 2 to Equation. 4 and outputs the calculated change value to the penalty addition unit 13. Current values of local fields $h_1$ to $h_N$ are respectively supplied to the $\Delta E$ calculation units 12a1 to 12aN from registers (not illustrated) for storing the local fields $h_1$ to $h_N$.

Although the $\Delta E$ calculation units 12a1 to 12aN include a $\Delta E$ calculation unit corresponding to the inequality constraint variable, the $\Delta E$ calculation unit corresponding to the inequality constraint variable outputs a relatively large value based on the constraint identification sign, thereby, suppressing the inversion of the inequality constraint variable, as will be described below.

The penalty addition unit 13 includes coefficient registers 13a1 to 13aK, multipliers 13b1 to 13bK, adders 13c11 to 13c1N, . . . , 13cK1 to 13cKN. Here, although K coefficient registers and multipliers corresponding to the indices of the inequality constraint variables such as the coefficient registers 13a1 to 13aK and the multipliers 13b1 to 13bK are illustrated, the coefficient registers and the multipliers are respectively provided with N pieces. That is, other coefficient registers and other multipliers not corresponding to the indices of the inequality constraint variables are not illustrated. Likewise, although adders of K groups (or K rows) corresponding to the inequality constraint variables such as the adders 13c11 to 13c1N, . . . , 13cK1 to 13cKN are illustrated, a group of the adders is provided with N groups (or N rows). That is, other adder groups not corresponding to the index of the inequality constraint variables are not illustrated.

The coefficient registers 13a1 to 13aK holds the importance coefficients $\lambda_1$ to $\lambda_K$ in Equation. 12 and Equation. 15 and supplies the importance coefficients to the multipliers 13b1 to 13bK corresponding to the coefficient registers 13a1 to 13aK.

The multipliers 13b1 to 13bK multiplies the $\Delta C_{1j}$ to $\Delta C_{Kj}$ ($j \in \Psi$) calculated by the constraint excess amount calculation unit 15 by the coefficients $\lambda_1$ to $\lambda_K$ and supplies the multiplied values to the adders 13c11 to 13c1N, . . . , 13cK1 to 13cKN.

Specifically, the multiplier 13b1 multiplies $\Delta C_{11}$ by $\lambda_1$ and supplies the multiplied value to the adder 13c11. Here, the multiplier 13b1 multiplies $\Delta C_{12}$ by $\lambda_1$ and supplies the multiplied value to the adder 13c12. Thereafter, likewise, the multiplier 13b1 multiplies $\Delta C_{1N}$ by $\lambda_1$ and supplies the multiplied value to the adder 13c1N.

The multiplier 13bK multiplies $\Delta C_{K1}$ by $\lambda_K$ and supplies the multiplied value to the adder 13cK1. In addition, the multiplier 13bK multiplies $\Delta C_{K2}$ by $\lambda_K$, and supplies the multiplied value to the adder 13cK2. Thereafter, likewise, the multiplier 13bK multiplies $\Delta C_{KN}$ by $\lambda_K$ and supplies the multiplied value to the adder 13cKN. The same applies to the other multipliers.

The adders 13c11 to 13c1N, . . . , 13cK1 to 13cKN add $\lambda_1 \Delta C_{11}$ to $\lambda_1 \Delta C_{1N}$, . . . , $\lambda_K \Delta C_{K1}$ to $\lambda_K \Delta C_{KN}$ supplied from the multipliers 13b1 to 13bK to $\Delta E_1$ to $\Delta E_N$ calculated by the energy change calculation unit 12.

Specifically, the adder 13c11 adds $\lambda_1 \Delta C_{11}$ to $\Delta E_1$ supplied from the $\Delta E$ calculation unit 12a1 and supplies the addition result to an adder (not illustrated) in a next stage corresponding to index 1. The adder $13c12$ adds $\lambda_1 \Delta C_{12}$ to $\Delta E_2$ supplied from the $\Delta E$ calculation unit $12a2$ and supplies the addition result to an adder in the next stage corresponding to index 2. Thereafter, likewise, the adder $13c1N$ adds $\lambda_1 \Delta C_{1N}$ to $\Delta E_N$ supplied from the $\Delta E$ calculation unit $12aN$ and supplies the addition result to an adder in the next stage corresponding to index N.

The adder $13cK1$ adds $\lambda_K \Delta C_{K1}$ to a value supplied from an adder (not illustrated) in the previous stage corresponding to the index 1 and outputs the addition result to the transition propriety determination unit $14a$. The adder $13cK2$ adds $\lambda_K \Delta C_{K2}$ to a value supplied from an adder in the previous stage corresponding to the index 2 and outputs the addition result to the transition propriety determination unit $14a$. Thereafter, likewise, the adder $13cKN$ adds $\Delta_K \Delta C_{KN}$ to a value supplied from an adder in the previous stage corresponding to the index N and outputs the addition result to the transition propriety determination unit $14a$.

The transition propriety determination unit $14a$ includes determination units $14a1$ to $14aN$. Each of the determination units $14a1$ to $14aN$ stochastically determines whether or not to allow inversion of the state variable $x_j$ by using Equation. 8, based on $\Delta E_1 + \Delta C_1$ to $\Delta E_N + \Delta C_N$ supplied from the penalty addition unit 13 and supplies flags $F_1$ to $F_N$ indicating whether or not to invert to the selection unit $14b$. A detailed circuit configuration of the determination units $14a1$ to $14aN$ will be described below.

The selection unit $14b$ selects a state variable to be inverted based on the flags $F_1$ to $F_N$ supplied from the transition propriety determination unit $14a$ and supplies the index of the state variable to the state holding unit 11. A detailed circuit configuration of the selection unit $14b$ will be described below.

The constraint excess amount calculation unit 15 includes a $\Delta C$ calculation units $15a1$ to $15aK$. The $\Delta C$ calculation units $15a1$ to $15aK$ calculate $\Delta C_{1j}$ to $\Delta C_{Kj}$ (j$\in\Psi$) based on Equation. 16 and supply the calculated values to the penalty addition unit 13.

Specifically, the $\Delta C$ calculation unit $15a1$ supplies $\Delta C_{11}$ to $\Delta C_{1N}$ to the multiplier $13b1$. Thereafter, likewise, the $\Delta C$ calculation unit $15aK$ supplies $\Delta C_{K1}$ to $\Delta C_{KN}$ to the multiplier $13bK$.

As described above, a function of the optimization device 10 may be realized by an electronic circuit. For example, the state holding unit 11, the energy change calculation unit 12, the penalty addition unit 13, the transition propriety determination unit $14a$, the selection unit $14b$, and the constraint excess amount calculation unit 15 may also be referred to as a state holding circuit, an energy change calculation circuit, a penalty addition circuit, a transition propriety determination circuit, a selection circuit, and a constraint excess amount calculation circuit, respectively.

Figure 5:
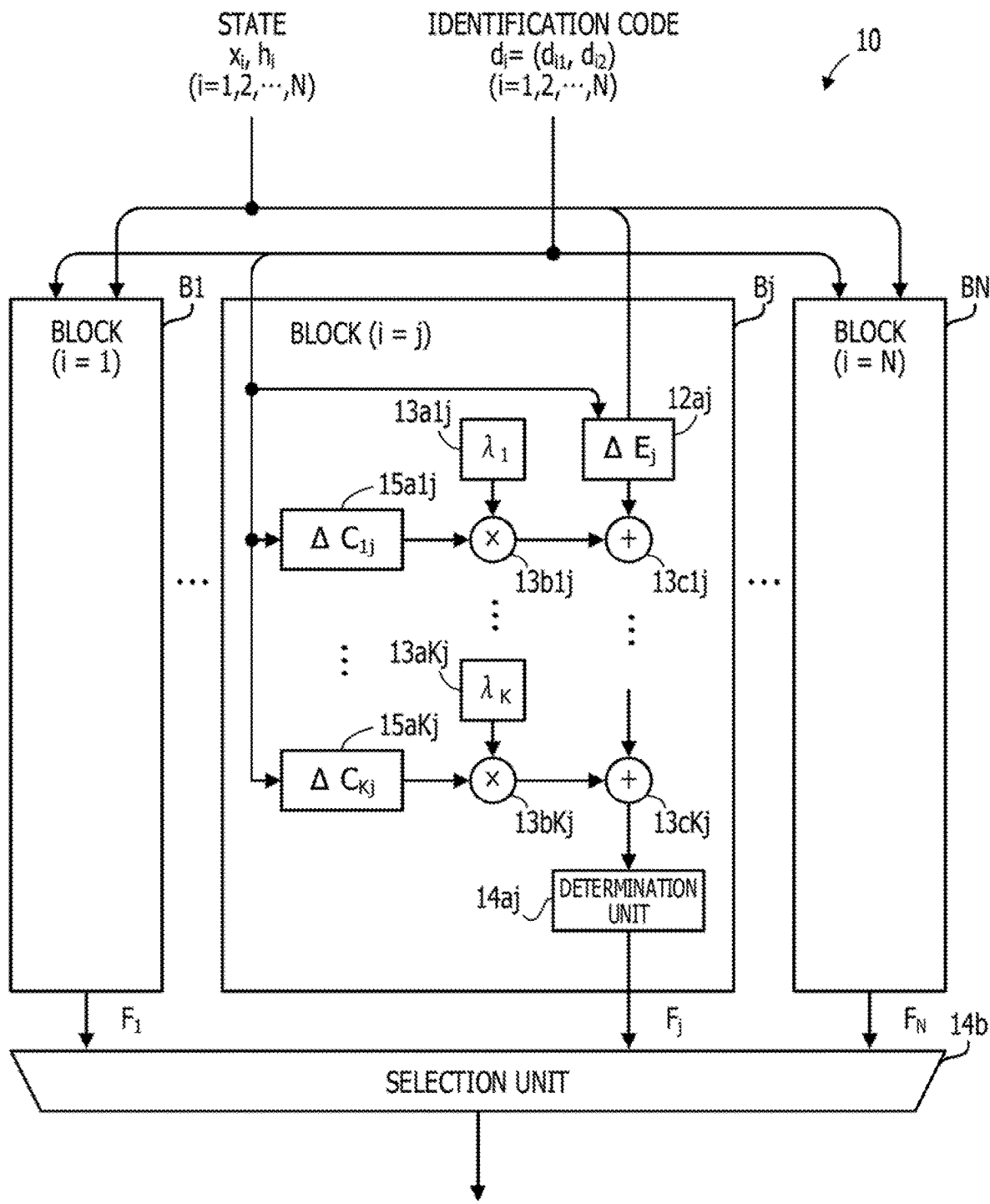
FIG. 5 is a diagram illustrating a block configuration example of a circuit of the optimization device.

FIG. 5 is a diagram illustrating a block configuration example of a circuit of the optimization device.

Circuit elements illustrated in FIG. 4 may be implemented separately in a block Bi corresponding to each of the indices i=1, 2, . . . , N. FIG. 5 illustrates the circuit configuration example of a j-th block Bj of the optimization device 10.

The block Bj includes a $\Delta E$ calculation unit $12aj$, a coefficient registers $13a1j$ to $13aKj$, multipliers $13b1j$ to $13bKj$, adders $13c1j$ to $13cKj$, a determination unit $14aj$, and $\Delta C$ calculation units $15a1j$ to $15aKj$.

The $\Delta E$ calculation unit $12aj$ calculates $\Delta E_j$ based on a value of the state variable $x_j$ corresponding to the index j and a value of the local field $h_j$ and supplies the calculated value to the adder $13c1j$.

The coefficient registers $13a1j$ to $13aKj$ hold the coefficients $\lambda_1$ to $\lambda_K$. The coefficient registers $13a1j$ to $13aKj$ may not be provided for each block and may be a shared register for each block.

The multipliers $13b1j$ to $13bKj$ respectively multiply $\lambda_1$ to $\lambda_K$ held in the coefficient registers $13a1j$ to $13aKj$ by $\Delta C_{1j}$ to $\Delta C_{Kj}$ supplied from the $\Delta C$ calculation units $15a1j$ to $15aKj$ and supply the multiplied values to the adders $13c1j$ to $13cKj$. The multipliers $13b1j$ to $13bKj$ are referred to as circuit elements corresponding to the index j of the multipliers $13b1$ to $13bK$ (for example, the multiplier $13b1j$ is a circuit corresponding to the index j of the multiplier $13b1$), respectively.

The adder $13c1j$ adds $\lambda_1 \Delta C_{1j}$ supplied from the multiplier $13b1j$ to $\Delta E_j$ supplied from the $\Delta E$ calculation unit $12aj$ and supplies the addition result to an adder (not illustrated) in the next stage. Thereafter, likewise, $\lambda_k C_{kj}$ (k$\in\Omega$) are sequentially added. The adder $13cKj$ adds $\lambda_K \Delta C_{Kj}$ to a value supplied from an adder (not illustrated) in a previous stage and supplies the result (corresponding to $\Delta E_j + \Delta C_j$) to the determination unit $14aj$.

The determination unit $14aj$ determines whether or not to perform inversion corresponding to the index j based on the change value $\Delta E_j + \Delta C_j$ of the total energy and outputs the flag $F_j$ according to the determination result to the selection unit $14b$.

The $\Delta C$ calculation units $15a1j$ to $15aKj$ calculate $\Delta C_{1j}$ to $\Delta C_{Kj}$, respectively, and supplies the calculated values to the multipliers $13b1j$ to $13bKj$. The $\Delta C$ calculation units $15a1j$ to $15aKj$ are referred to as circuit elements corresponding to the index j of the $\Delta C$ calculation units $15a1$ to $15aK$ (for example, the $\Delta C$ calculation unit $15a1j$ is a circuit element corresponding to the index j of the $\Delta C$ calculation unit $15a1$), respectively.

Here, a constraint identification sign indicating whether the index j corresponds to a normal state variable or to an inequality constraint variable is input to the block Bj by the constraint identification sign input unit 16. The constraint identification sign includes an identification code for identifying no constraint (which does not correspond to the inequality constraint variable), constraint of only an upper limit, constraint of only a lower limit, or constraint of both the upper limit and the lower limit.

For example, an identification code $d_i$ is represented by 2-bit ($d_{i1}$ and $d_{i2}$). The identification code $d_i$=00 indicates that the index i is an index of a normal state variable. The identification code $d_i$=01 indicates that the index i is an index of constraint of only the upper limit (or an inequality constraint variable corresponding to the constraint of only an upper limit). The identification code $d_i$=10 indicates that the index i is an index of constraint only the lower limit (or an inequality constraint variable corresponding to the constraint of only a lower limit). The identification code $d_i$=11 indicates that the index i is an index of constraint of both the upper limit and the lower limit (or an inequality constraint variable corresponding to the constraint of both the upper limit and the lower limit).

The constraint identification sign also includes designation of an upper limit value and a lower limit value for the identification code. For example, the constraint identification sign becomes a set of (the identification code, the upper limit value, and the lower limit value).

In a case of the equality constraint, the identification code $d_i$=11 is used, and the upper limit value and the lower limit value are matched as described above. The $\Delta E$ calculation unit $12aj$ calculates $\Delta E_j$ for the index j according to the identification code. The $\Delta C$ calculation unit $15a1j$ to $15aKj$ calculates $\Delta C_{1j}$ to $\Delta C_{Kj}$ for the index j according to the identification code. An example of a method for calculating $\Delta E_j$ and $\Delta C_{1j}$ to $\Delta C_{Kj}$ according to the identification code will be described below.

Figure 6:
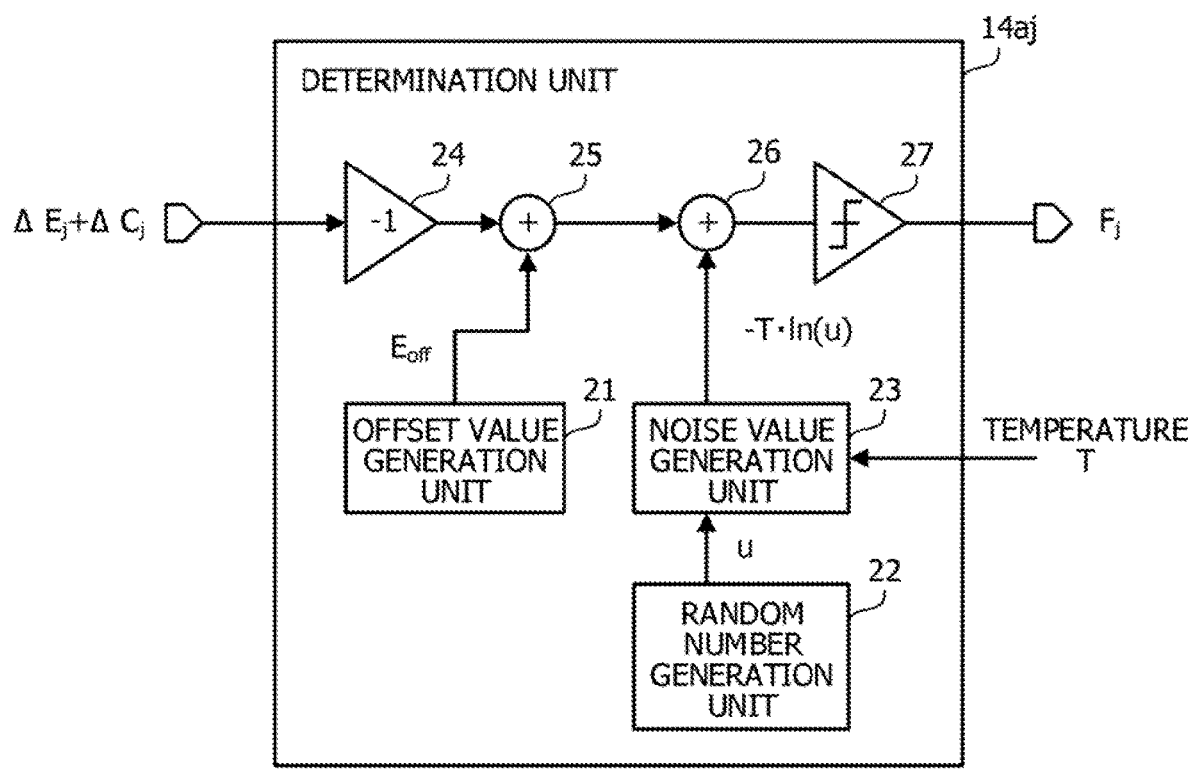
FIG. 6 is a diagram illustrating a circuit configuration example of a determination unit.

FIG. 6 is a diagram illustrating a circuit configuration example of the determination unit.

The determination unit 14aj includes an offset value generation unit 21, a random number generation unit 22, a noise value generation unit 23, a sign inversion circuit 24, adders 25 and 26, and a comparator 27.

The offset value generation unit 21 generates an offset value $E_{off}$ ($E_{off} \geq 0$) based on a flag indicating transition propriety output from the selection unit 14b and supplies the offset value to the adder 25. Specifically, when the flag output from the selection unit 14b indicates a possible transition, the offset value generation unit 21 resets the offset value to 0. When the flag output from the selection unit 14b indicates an impossible transition, the offset value generation unit 21 adds an increment value $\Delta E_{off}$ to the offset value. When the flag continuously indicates the impossible transition, the offset value generation unit 21 integrates $\Delta E_{off}$ to increase the $E_{off}$ by $\Delta E_{off}$.

The random number generation unit 22 generates a uniform random number u of $0 < u \leq 1$ and outputs the uniform random number u to the noise value generation unit 23.

The noise value generation unit 23 holds a predetermined conversion table according to a use rule (for example, the Metropolis method). The noise value generation unit 23 generates a value of $-T \cdot \ln(u)$ corresponding to a noise value (thermal noise) based on Equation. 8 according to the conversion table by using the uniform random number u and temperature information indicating the temperature T supplied by the control unit (or control circuit). The noise value generation unit 23 outputs the generated value of $-T \cdot \ln(u)$ to the adder 26.

The sign inversion circuit 24 inverts a sign of the change value $(\Delta E_j + \Delta C_j)$ of the total energy supplied from the adder 13cKj and supplies the inverted sign to the adder 25.

The adder 25 adds the offset value $E_{off}$ to $-(\Delta E_j + \Delta C_j)$ supplied from the sign inversion circuit 24 and supplies the addition result to the adder 26.

The adder 26 adds the thermal noise $-T \cdot \ln(u)$ to $-(\Delta E_j + \Delta C_j) + E_{off}$ supplied from the adder 25 and supplies the addition result to the comparator 27.

The comparator 27 compares the evaluation value $(-(\Delta E_j + \Delta C_j) + E_{off} - T \cdot \ln(u))$ output from the adder 26 with a threshold value (specifically, 0) to perform determination based on Equation. 8. When the evaluation value is greater than or equal to 0, the comparator 27 outputs a flag ($F_j = 1$) indicating the possible transition to the selection unit 14b. When the evaluation value is less than 0, the comparator 27 outputs a flag ($F_j = 0$) indicating the impossible transition to the selection unit 14b.

Here, when the flag output from the selection unit 14b indicates the impossible transition, it is considered that a current state falls into a local solution. A state transition is easily allowed by adding $E_{off}$ to $-(\Delta E_j + \Delta C_j)$ and gradually increasing $E_{off}$ by the offset value generation unit 21, and when the current state is in the local solution, an escape from the local solution is promoted.

Next, a circuit configuration example of the selection unit 14b will be described.

Figure 7:
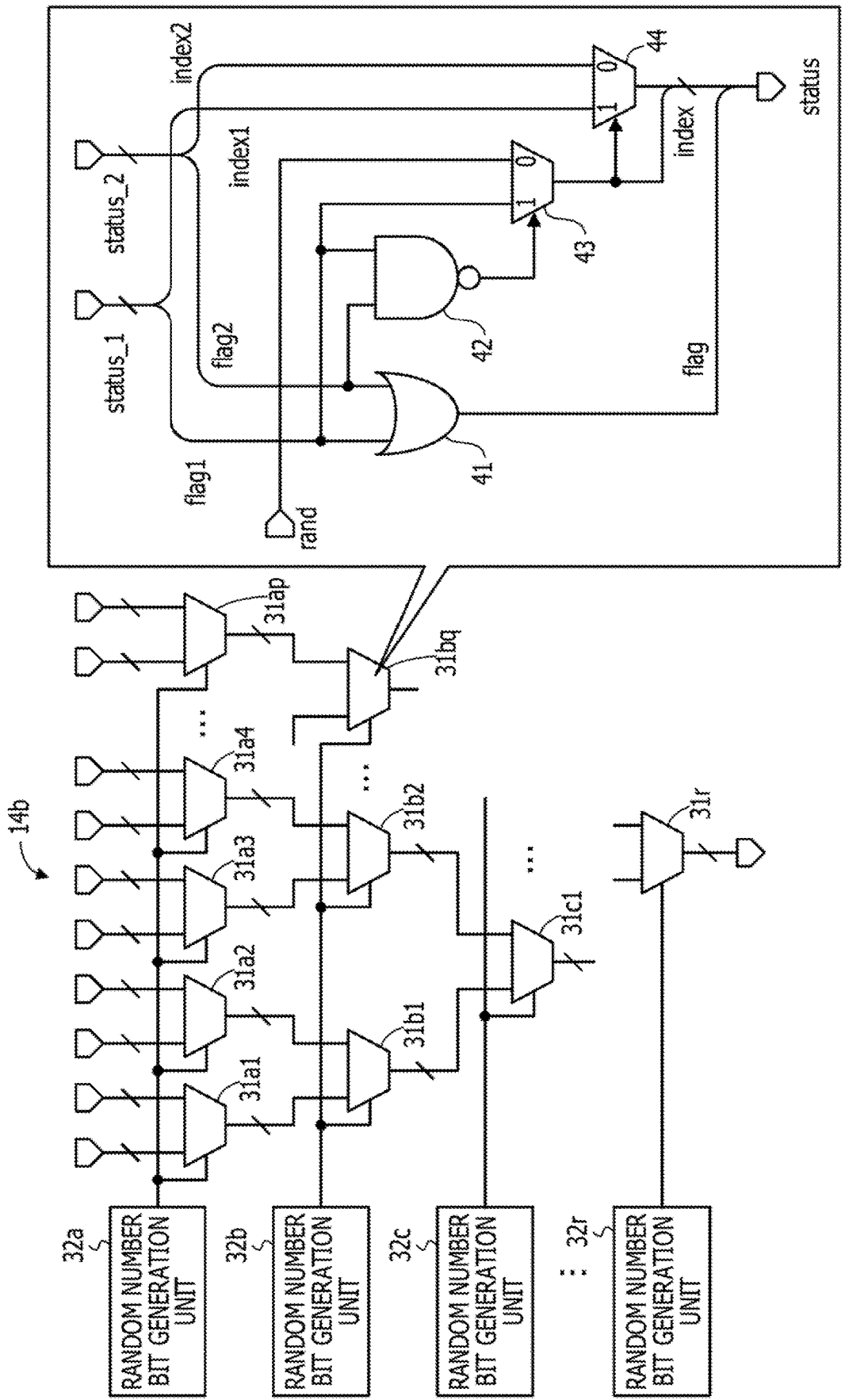
FIG. 7 is a diagram illustrating a circuit configuration example of a selection unit.

FIG. 7 is a diagram illustrating the circuit configuration example of the selection unit.

The selection unit 14b includes a plurality of selector units coupled in a tree shape over a plurality of stages and random number bit generation units 32a, 32b, . . . , 32r. The random number bit generation units 32a to 32r are provided for each stage of the plurality of selector units coupled in the tree shape. Each of the random number bit generation units 32a to 32r generates a 1-bit random number having a value of 0 or 1 and supplies the generated random number to the selection circuit of each stage. The 1-bit random number is used to select one of the pairs of input flags.

A set of flags indicating transition propriety and output from each of the determination units 14a1 to 14aN is input to each of the selector units 31a1, 31a2, . . . , and 31ap in a first stage. For example, a pair of the flag output from the first determination unit 14a1 and the flag output from the second determination unit 14a2 is input to the selector unit 31a1. In addition, a pair of the flag output from the third determination unit and the flag output from the fourth determination unit is input to the selector unit 31a2. Thereafter, likewise, a pair of the flag output from the N–1-th determination unit and the flag output from the N-th determination unit 14aN is input to the selector unit 31ap. As such, the pair of flags output from the adjacent determination units is input to the selector unit in the first stage. The number of the selector units 31a1 to 31ap in the first stage is N/2. Thereafter, the number of selector units is halved each time when passing a stage.

Each of the selector units 31a1 to 31ap selects one of the pair of input flags based on the pair of input flags and the 1-bit random number output from the random number bit generation unit 32a. Each of the selector units 31a1 to 31ap outputs a state signal including the selected flag and an identification value of 1 bit corresponding to the selected flag to the selector units 31b1 to 31bq in a second stage. For example, the state signal output from the selector unit 31a1 and the state signal output from the selector unit 31a2 are input to the selector unit 31b1. Likewise, a pair of state signals output from the adjacent selector units of the selector units 31a1 to 31ap is input to the selector unit in the second stage.

Each of the selector units 31b1 to 31bq selects one of the input state signals based on a pair of the input state signals and the 1-bit random number output from the random number bit generation unit 32b. The respective selector units 31b1 to 31bq output the selected state signals to selector units 31c1, . . . in a third stage. Here, the selector units 31b1 to 31bq perform updating by adding 1 bit to the state signal included in the selected state signals so as to indicate which state signal is selected, and output the selected state signal.

Similar processing is also performed by the selector units in the third and subsequent stages, a bit width of the identification value is increased by the selector unit in each stage by 1 bit, and the state signal which is an output of the selection unit 14b is output from the selector unit 31r in the final stage. The identification value included in the state signal output from the selection unit 14b corresponds to an index represented by a binary number. In the circuit configuration example illustrated in FIG. 7, the index of the variable starts at 0 (a value obtained by adding 1 to the identification value output by the selection unit 14b may be set as the index to correspond to the index starting at 1).

For example, FIG. 7 illustrates the circuit configuration example of the selector unit 31bq. Other selector units in the second and subsequent stages are also realized by a similar circuit configuration as the selector unit 31bq.

An input of the selector unit 31bq is a first state signal (status_1) and a second state signal (status_2). An output of the selector unit 31b1 is a state signal (status). The selector unit 31bq includes an OR circuit 41, a NAND circuit 42, and selector 43 and 44.

A flag (flag1) included in the state signal (status_1) and a flag (flag2) included in the state signal (status_2) are input to the OR circuit 41. For example, the state signal (status_1) is an output on a higher side (a larger side of the index) of two selector units in a previous stage, and the state signal (status_2) is an output on a lower side (a smaller side of the index) of the two selector units on the previous stage. The OR circuit 41 outputs an OR operation result (flag) of flag1 and flag2.

flag1 and flag2 are input to the NAND circuit 42. The NAND circuit 42 outputs a NAND operation result of flag1 and flag2 to a selection signal input terminal of a selector 43.

The selector 43 receives flag1 and a 1-bit random number (rand). The selector 43 selects and outputs either flag1 or rand based on the NAND operation result input from the NAND circuit 42. For example, when the NAND operation result of the NAND circuit 42 is "1", the selector 43 selects flag1, and when the NAND operation result of the NAND circuit 42 is "0", the selector 43 selects rand.

A selector 44 receives an identification value (index1) included in the state signal (status_1) and an identification value (index2) included in the state signal (status_2). A selection result of the selector 43 is input to a selection signal input terminal of the selector 44. The selector 44 selects and outputs either index1 or index2 based on the selection result of the selector 43. For example, when the selection result of the selector 43 is "1", the selector 44 selects index1, and when the selection result of the selector 43 is "0", the selector 44 selects index2.

A set of outputs from the OR circuit 41 and the selectors 43 and 44 is a state signal (status) output from the selector unit 31$bq$.

An input of the selector unit in the first stage does not include the identification value. Therefore, the selector unit in the first stage becomes a circuit that adds a bit value corresponding to the selected value ("0" in a case of the lower side and "1" in a case of the higher side) as the identification value (expressed as index in the drawing) and outputs the addition result.

As such, the selection unit 14$b$ selects one of the spin bits of possible transition in a tournament mode. In each match of tournament (that is, selection in each selection circuit), an entry number (0 or 1) of the win (that is, the selected one) is added to the upper bit of an index word. An index output from the selector unit 31$r$ in the final stage indicates the selected spin bit. For example, when the number N of variables is 1024, the state signal output from the selector unit 31$r$ in the final stage includes a flag indicating transition propriety and an index represented by 10-bits.

However, a method other than the method generated by the selection unit 14$b$ as described above is also considered as an index output method. For example, an index corresponding to each determination unit may be supplied from each of the determination units 14$a$1 to 14$a$N to the selection unit 14$b$, and the selection unit 14$b$ may select an index corresponding to the flag, together with a flag indicating transition propriety. In this case, each of the determination units 14$a$1 to 14$a$N further includes an index register for storing an index corresponding to itself and supplies an index to the selection unit 14$b$ from the index register.

Figure 8:
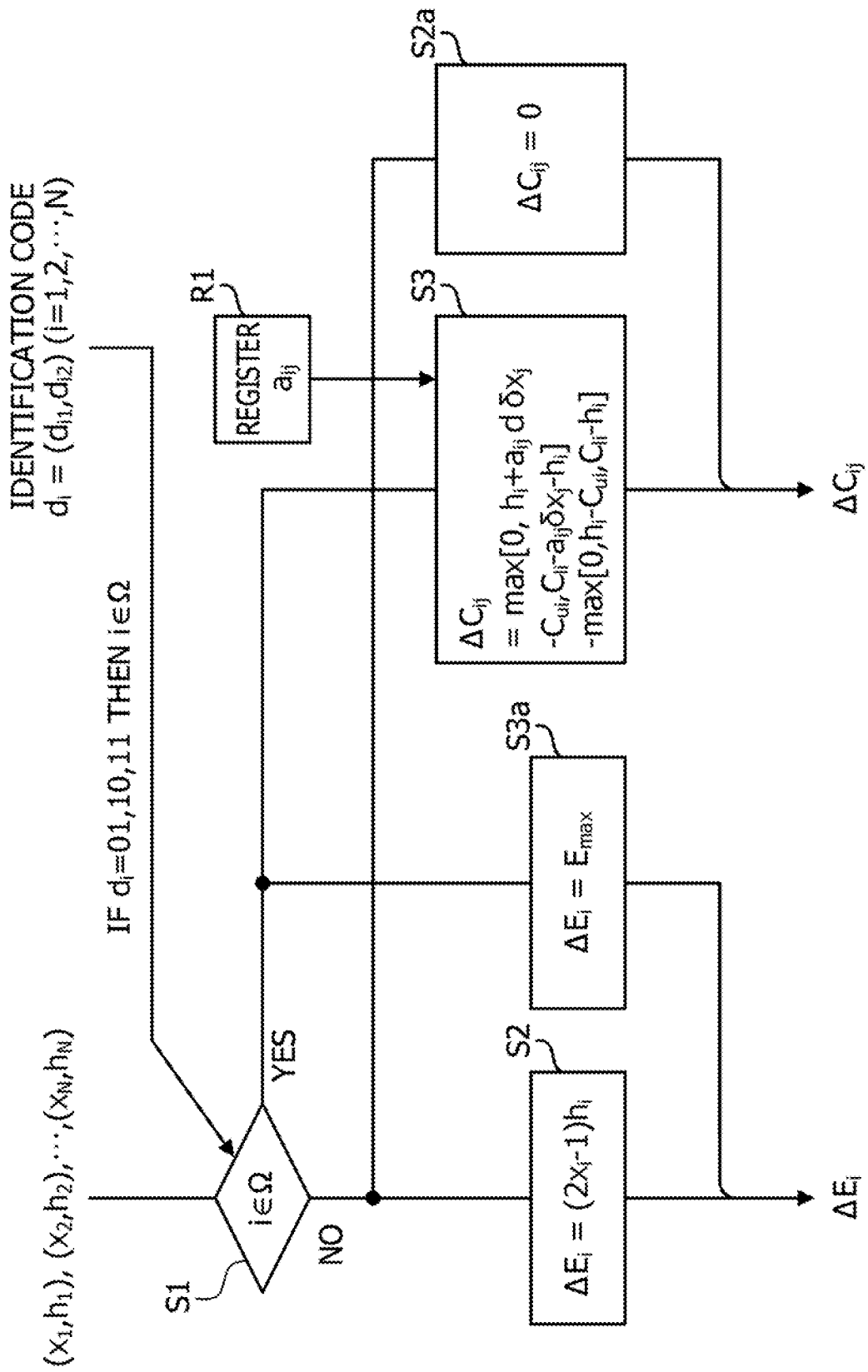
FIG. 8 is a diagram illustrating a calculation example of $\Delta E$ and $\Delta C$ for each variable.

FIG. 8 is a diagram illustrating a calculation example of $\Delta E$ and $\Delta C$ for each variable.

The optimization device 10 performs the following procedure in parallel for $(x_1, h_1), (x_2, h_2), \ldots, (x_N, h_N)$ relating to all i (i=1 to N), and the identification code $d_i$.

(S1) The optimization device 10 determines whether or not i∈Ω. If i∈Ω is not satisfied, the processing proceeds to step S2 and step S2$a$. If i∈Ω is satisfied, the processing proceeds to step S3 and step S3$a$. Whether or not i∈Ω may be determined by $d_i=(d_{i1}, d_{i2})$. That is, if at least one of $d_{i1}$ and $d_{i2}$ is 1 ($d_i$=01, 10, 11), i∈Ω is satisfied. In addition, if both $d_{i1}$ and $d_{i2}$ are 0 ($d_i$=00), i∈Ω is not satisfied.

(S2) The optimization device 10 sets $\Delta E_i$ as a value ($\Delta E_i=(2x_i-1)h_i$) calculated by Equation. 2.

(S2$a$) The optimization device 10 sets $\Delta C_{ij}=0$ over all the indices j.

(S3) The optimization device 10 sets $\Delta C_{ij}$ as a value calculated by Equation. 16 over all the indices j based on the coefficient $a_{ij}$ stored in a register R1 holding a matrix W. The local field $h_i$ used for calculating $\Delta C_{ij}$ is supplied to each $\Delta C$ calculation unit which calculates $\Delta C_{ij}$ for the inequality constraint i from a register holding $h_i$.

(S3$a$) The optimization device 10 is assumed to be $\Delta E_i=E_{max}$. Here, $E_{max}$ is a very large value and is a value at which $F_i=0$ by determination of the determination unit 14$ai$ at all times. For example, it may be considered that $E_{max}$ is a maximum value of values that may be set as $\Delta E_i$.

In addition, the optimization device 10 monitors the energy E(x) corresponding to the QUBO term of the total energy $E_{tot}(x)$ by using the following circuit.

Figure 9:
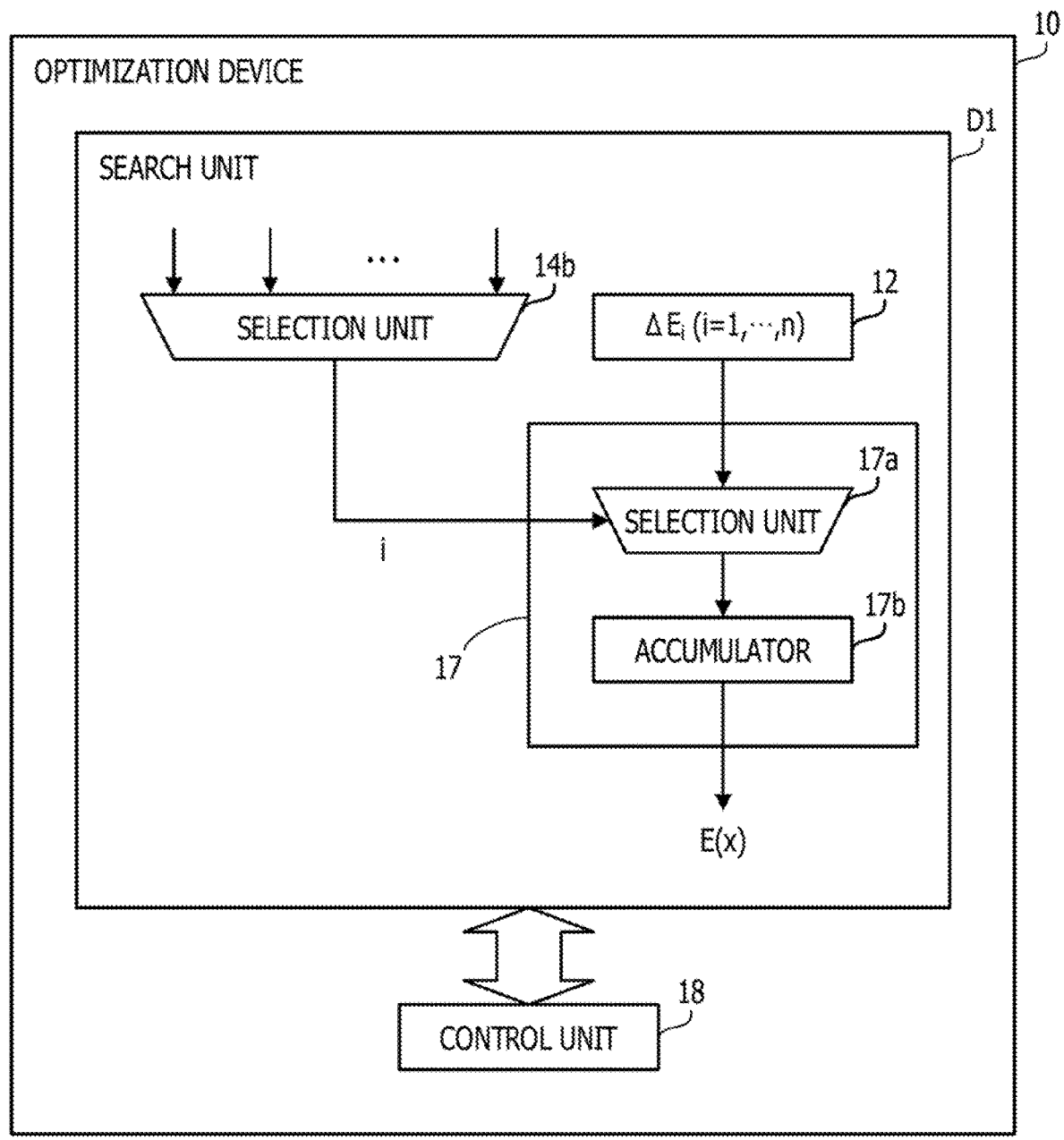
FIG. 9 is a diagram illustrating a circuit configuration example for calculating energy corresponding to the function E(x).

FIG. 9 is a diagram illustrating a circuit configuration example for calculating the energy corresponding to the function E(x).

The optimization device 10 further includes an energy calculation unit 17 and a control unit 18.

The energy calculation unit 17 calculates the energy E(x) corresponding to the QUBO term of the total energy $E_{tot}(x)$. The energy calculation unit 17 selects any one of a plurality of energy change values output from the energy change calculation unit 12 based on identification information of a state variable of a change target selected by the update control unit 14. The energy calculation unit 17 calculates the energy value E(x) corresponding to values of a plurality of state variables held in the state holding unit 11 by accumulating the selected change values. Specifically, the energy calculation unit 17 includes a selection unit 17$a$ and an accumulator 17$b$.

The selection unit 17$a$ receives a selection result of the index i of the state variable to be inverted from the selection unit 14$b$. The selection unit 17$a$ selects $\Delta E_i$ corresponding to the index i supplied from the selection unit 14$b$ among $\Delta E_i$ (i=1, ..., n) output from the energy change calculation unit 12 and outputs the selected $\Delta E_i$ to the accumulator 17$b$.

The accumulator 17$b$ holds a value of the energy E(x), accumulates $\Delta E_i$ supplied from the selection unit 17$a$ in the value of the energy E(x), updates the energy E(x) corresponding to the current value of the state variable, and outputs the energy E(x). An initial value of the energy E(x) is applied to the accumulator 17$b$ at the time of starting the operation for an initial value of a state vector.

The control unit 18 controls operation of a search unit D1 in the optimization device 10. Here, the search unit D1 is a circuit block including the state holding unit 11, the energy change calculation unit 12, the penalty addition unit 13, the update control unit 14, the constraint excess amount calculation unit 15, the constraint identification sign input unit 16, the selection unit 17$a$, and the accumulator 17$b$. The control unit 18 controls the number of searches (the number of inversions of the state variable) of the search unit D1, temperature setting, or the like. The control unit 18 is realized by an electronic circuit. The control unit 18 is also referred to as a control circuit.

The optimization device 10 may monitor the energy E(x) corresponding to the QUBO term according to the circuit configuration illustrated in FIG. 9. By monitoring the energy E(x) according to the circuit configuration of FIG. 9, there is an advantage that there is no overflow of calculation of the energy E(x) even when a value of the coefficient A in the inequality constraint term in the inequality constraint is relatively large.

Next, a procedure of operations performed by the optimization device 10 will be described.

FIG. 10 is a flowchart illustrating an operation example of the optimization device.

(S10) The control unit 18 initializes the search unit D1. For example, the control unit 18 receives external setting such as temperature, a repetition count C1 for temperature, or a temperature update count C2, and sets an initial temperature in the search unit D1. In addition, the control unit 18 sets a constraint identification sign in the constraint identification sign input unit 16. The control unit 18 sets an initial state in the state holding unit 11. At this time, the control unit 18 sets a value of the variable designated as the inequality constraint variable by the constraint identification sign to 0. In addition, the control unit 18 sets an initial value of the local field corresponding to the weight W, the coefficient A, and each variable to a predetermined register, and sets the energy E(x) corresponding to the initial state in the accumulator 17b. When initialization is completed, the control unit 18 causes the search unit D1 to start the operation.

While the following steps S11 and S12 are described by focusing on a block Bj, steps S11 and S12 are performed in parallel in blocks B1 to BN.

(S11) The block Bj reads $h_j$ and $x_j$. As described above, $h_j$ is held in a predetermined register. $x_j$ is held in the state holding unit 11.

(S12) The block Bj calculates $\Delta C_{ij}$ and $\Delta E_j$ based on the procedure in FIG. 8, calculates $\Delta C_j$ based on $\Delta C_{ij}$, and obtains $\Delta E_{tot\ j} = \Delta E_j + \Delta C_j$. The block Bj adds $E_{off}$ to $-(\Delta E_j + \Delta C_j)$, and further outputs a flag $F_j$ based on determination of an evaluation value obtained by adding a thermal noise $-T \cdot \ln(u)$ and a threshold value.

(S13) The selection unit 14b selects the index i of an inversion target based on flags $F_1$ to $F_N$ output from blocks B1 to BN, and supplies the selected index i to the state holding unit 11.

(S14) The state holding unit 11 inverts (changes) a value of a state variable $x_i$ corresponding to the index i supplied from the selection unit 14b, thereby, updating a state and updating the local field h corresponding to each variable held in a predetermined register (updating based on Equation. 4). In description of this step, an index of a change target is represented as i. The value of the local field for the inequality constraint variable based on Equation. 13 is also updated by the updating.

(S15) At the current temperature, the control unit 18 determines whether or not the state variable is updated by a specified number of times C1. When the updating is performed only by the specified number of times C1, the processing proceeds to step S16. When the updating is not performed by the specified number of times C1, the processing proceeds to step S11.

(S16) The control unit 18 updates a temperature. Accordingly, the temperature T set in the search unit D1 is lowered. The control unit 18 lowers the temperature T set in the search unit D1 according to a predetermined method each time the specified number of times C1 is updated.

(S17) The control unit 18 determines whether or not the temperature is updated by a specified number of times C2. When the temperature is updated by the specified number of times C2, the processing proceeds to step S18. When the temperature is not updated by the specified number of times C2, the processing proceeds to step S11.

(S18) The control unit 18 outputs a state corresponding to the lowest energy (minimum value of the energy E(x)) output from the accumulator 17b. For example, the control unit 18 may output a state in which the search unit D1 finally reaches as a state corresponding to the lowest energy. Alternatively, the control unit 18 may output the state corresponding to the lowest energy reached by the search unit D1 during the search process.

Here, in step S12, the penalty addition unit 13 adds a penalty value to an energy change value as follows, thereby, calculating a total energy change value $\Delta E_{tot\ j} = \Delta E_j + \Delta C_j$ ($j \in \Psi$).

For example, the penalty addition unit 13 calculates the penalty value $\Delta C_j$ by multiplying the change value $\Delta C_{ij}$ of the constraint excess amount calculated based on the coupling coefficient $a_{ij}$ ($i \in \Omega$) and the threshold values ($C_{ui}$ and $C_{li}$) by the importance coefficient $\lambda_i$ indicating importance of the inequality constraint i, and adds the calculated penalty value to $\Delta E_j$. When there are a plurality of inequality constraints, the penalty addition unit 13 obtains the sum of $\lambda_i \Delta C_{ij}$ of each inequality constraint for i, thereby, obtaining $\Delta C_j$. A weight of the inequality constraint for the QUBO term or a weight of each inequality constraint when there are a plurality of inequality constraints may be adjusted by the importance coefficient, and a solution is made.

In addition, when the inequality constraint is an inequality constraint for an upper limit constraint value $C_{ui}$ ($i \in \Omega$), the penalty addition unit 13 adds a first penalty value $\Delta C_j$ according to a change value of a first excess amount, which is calculated based on a first coupling coefficient $a_{ij}$ and a first threshold value $C_{ui}$, in a positive direction for the first threshold value $C_{ui}$, to each of the plurality of energy change values. $\Delta E_j$.

In addition, when the inequality constraint is an inequality constraint to the lower limit constraint value $C_{li}$, the penalty addition unit 13 adds a second penalty value $\Delta C_j$ according to a change value of a second excess amount, which is calculated based on a second coupling coefficient $a_{ij}$ and a second threshold value $C_{li}$, in a negative direction for the second threshold value $C_{li}$, to each of the plurality of energy change values $\Delta E_j$.

In addition, when the inequality constraint is an inequality constraint for the upper limit constraint value $C_{ui}$ and the lower limit constraint value $C_{li}$, the penalty addition unit 13 adds a third penalty value $\Delta C_j$ according to a larger change value between a change value of a third excess amount, which is calculated based on the third coupling coefficient $a_{ij}$ and the third threshold value $C_{ui}$ in a positive direction for a third threshold value $C_{ui}$, and a change value of a fourth excess amount, which is calculated based on a third coupling coefficient $a_{ij}$ and the fourth threshold value $C_{li}$ smaller than the third threshold value $C_{ui}$ in a negative direction for a fourth threshold value $C_{li}$, to each of the plurality of energy change values $\Delta E_j$.

In addition, in a case of an equality constraint for a predetermined constraint value, the penalty addition unit 13 adds a fourth penalty value $\Delta C_j$ according to a larger change value between a change value of a fifth excess amount, which is calculated based on the fourth coupling coefficient $a_{ij}$ and the fifth threshold value $C_{ui} = C_{li}$ in a positive direction for a fifth threshold value $C_{ui} = C_{li}$, and a change value of a sixth excess amount in a negative direction for the fifth threshold value $C_{ui} = C_{li}$, to each of the plurality of energy change values $\Delta E_j$.

Figure 11A:
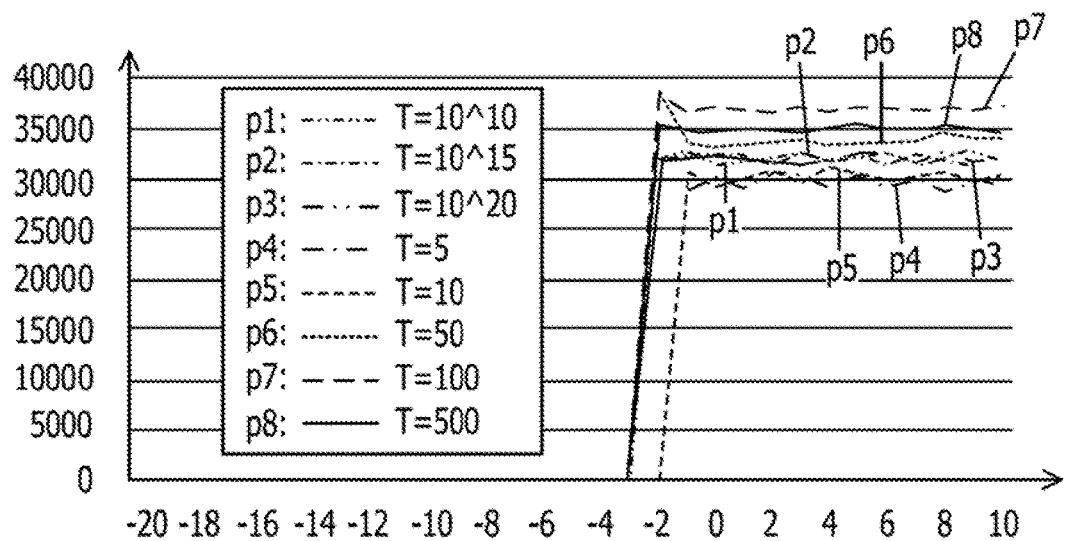
FIGS. 11A and 11B are a diagram illustrating an example of comparison between solution results.
Figure 11B:
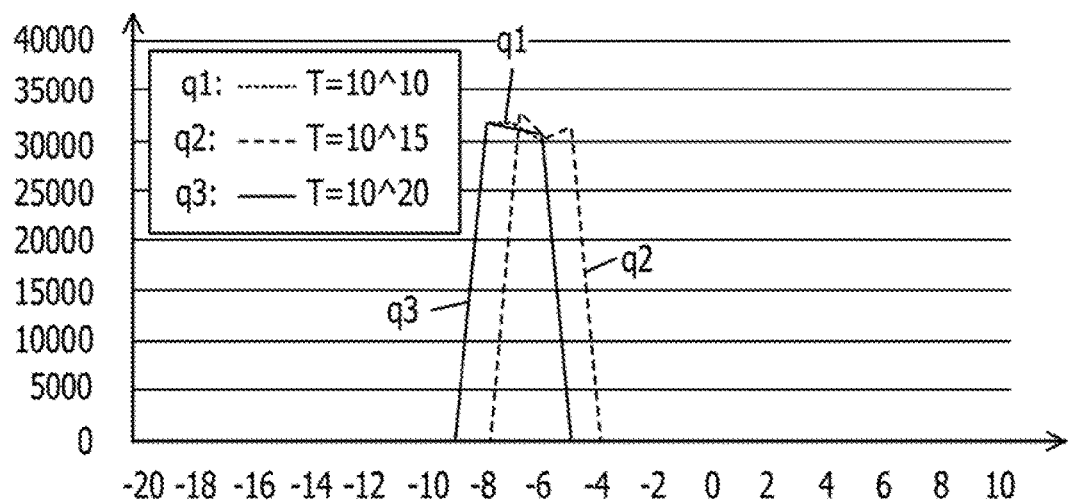

FIGS. 11A and 11B are a diagram illustrating an example of a comparison between solution results.

FIG. 11A illustrates an example of the solution results for an optimization problem including an inequality constraint, for which the optimization device 10 is used. FIG. 11B illustrates an example of the solution results for an optimization problem, for which an existing optimization device that does not include the penalty addition unit 13 is used, when the inequality constraint is represented in a quadratic form of the state variable (in a case of a square constraint).

Here, in FIGS. 11A and 11B, a knapsack problem is considered as the example of the optimization problem. When the Knapsack problem is solved by using an existing optimization device (not including the penalty addition unit 13), the problem may be formulated as follows.

The knapsack problem considered here is a problem in which N articles (a weight of an article of the index i is $w_i$ and a price is $v_i$) are input to a knapsack with a loading capacity C and a total price (total value) of the articles in the knapsack is maximized. When an article i is input to the knapsack, the state variable $x_i=1$, and when the article i is not input to the knapsack, the state variable $x_i=0$.

In this case, a total value V of the articles in the knapsack is represented by Equation. 18.

[Equation. 18]

$$V = \sum_{i=1}^{N} v_i x_i \quad (18)$$

In addition, a capacity constraint of the knapsack is represented by Equation. 19.

[Equation. 19]

$$W = \sum_{i=1}^{N} w_i x_i \leq C \quad (19)$$

The capacity constraint of Equation. 19 is represented by Equation. 20 by using a slack variable S (S≥0).

[Equation. 20]

$$S + \sum_{i=1}^{N} w_i x_i = C \quad (20)$$

An objective function E of QUBO is represented by Equation. 21 based on Equation. 20.

[Equation. 21]

$$E = -\sum_{i=1}^{N} v_i x_i + \left(C - S - \sum_{i=1}^{N} w_i x_i\right)^2 \quad (21)$$

It is considered that S is binary-expanded as in Equation. 22 and solved as a QUBO form of the state variables $x_i$ and $y_j$. The QUBO form of the state variables $x_i$ and $y_i$ is represented by Equation. 23.

[Equation. 22]

$$S = \sum_{j=0}^{n} 2^j y_j \quad (22)$$

[Equation. 23]

$$E = -\sum_{i=1}^{N} v_i x_i + \left(C - \sum_{j=0}^{n} 2^j y_j - \sum_{i=1}^{N} w_i x_i\right)^2 \quad (23)$$

Since the slack variable S becomes a relatively small value in optimization, an optimal solution may be obtained even if S=0. Therefore, Equation. 24 is obtained.

[Equation. 24]

$$E = -\sum_{i=1}^{N} v_i x_i + \left(C - \sum_{i=1}^{N} w_i x_i\right)^2 \quad (24)$$

In comparison of FIG. 11, following test data was prepared to perform an experiment.

The knapsack capacity C=4952991. The weights W=$D_1$ to $D_N$ for each article are values obtained by adding 100000 to uniform random numbers of a section [0, 100], respectively. The prices P=$P_1$ to $P_N$ for each article are values generated as uniform random numbers of a section [1, 1000], respectively.

In addition, the experimental conditions were as follows. First, the importance coefficient λ for the inequality constraint is set as λ=10^z and z increases by 1 from −10 to 10. Second, the temperatures T=5, 10, 50, 100, and 500 (initial temperature) are set, and an operation is performed by using a Monte Carlo method according to the Metropolis standard, respectively. Third, 100 initial values of the random number u are prepared, and if there is an initial value which 10 gives a solution that satisfies at least one of the constraints, "a solution is obtained".

The energy function E(x) including the inequality constraint (absolute value constraint) for the optimization device 10 in the comparison of FIG. 11 is represented by Equation. 25.

[Equation. 25]

$$E(P, W, C \mid x) = -\sum_{i=1}^{N} P_i x_i + \lambda \max\left\{0, \sum_{i=1}^{N} D_i x_i - C\right\} \quad (25)$$

In addition, the energy function E(x) in a case of the square constraint of the comparison in FIG. 11 is represented by Equation. 26.

[Equation. 26]

$$E(P, W, C \mid x) = -\sum_{i=1}^{N} P_i x_i + \lambda \left\{\sum_{i=1}^{N} D_i x_i - C\right\}^2 \quad (26)$$

However, in Equation. 26, since a small value is optimal for the slack variable, the slack variable was set to 0.

A horizontal axis of each of the graphs of FIG. 11(A) and FIG. 11(B) is z in λ=10^z. A vertical axis of each of the graphs of FIGS. 11(A) and 11(B) is a total values (maximum) of the values $P_i$. When the constraint is not satisfied, $P_i=0$.

In the above experimental conditions, if λ is greater than or equal to 10^(−1) at any temperature in an absolute value constraint, a solution is obtained, whereas in the square constraint, all $P_i=0$, and a solution satisfying the constraint is not obtained. Therefore, when a range of λ is widened and the temperature T is set to be large such that T=10^10, 10^15, and 10^20, the solution is obtained only in a limited range in the square constraint, and it is found that a relatively large cost is incurred in the search by the square constraint.

It is considered that a reason why the solution may not be obtained when the coefficient λ is relatively small is that a value of the inequality constraint term is smaller than the total value, and thus, constraints are almost neglected and likelihood of obtaining a solution that satisfies the constraint is decreased.

In FIG. 11(A), a sequence p1 is a case where T=10^10. A sequence p2 is a case where T=10^15. A sequence p3 is a case where T=10^20. A sequence p4 is a case where T=5. A sequence p5 is a case where T=10. A sequence p6 is a case where T=50. A sequence p7 is a case where T=100. A sequence p8 is a case where T=500.

In FIG. 11(B), a sequence q1 is a case where T=10^10. A sequence q2 is a case where T=10^15. A sequence q3 is a case where T=10^20. In the example of the square constraint illustrated in FIG. 11(B), a solution for sequences corresponding to the temperatures T=5, 10, 50, 100, and 500 was not obtained, and thus, illustration thereof is omitted.

In a case of the square constraint, cause of such a result is considered to be in an equation of an energy function of the square constraint. That is, when a total weight of articles contained in the knapsack is near a capacity of the knapsack, the energy based on Equation. 26 increases even if the articles are removed, and thus, a search may not be performed. Particularly, in a case of the square constraint, contribution of the inequality constraint term to a value of the energy function E(x) of Equation. 26 may be excessive more than a case of an absolute value constraint represented by a linear term by a quadratic term.

Here, since various constraint conditions are included in the optimization problem, it may be difficult to formulate the problem only in the quadratic form. In addition to the above-described examples, constraints represented by the inequality, such as that a demanded resource amount does not exceed an upper limit or does not fall below a lower limit, for example, an upper limit of loading amount such as a vehicle dispatch delivery problem, an upper limit of a budget for constructing a factory, or the like, may frequently appear.

There is a problem that these inequality constraints may be difficult to be solved by the existing optimization device in the quadratic form and may be difficult to reach an optimal solution when searching to strictly satisfy the inequality constraint. This is because it is often impossible to reach the optimal solution without passing through an intermediate state that breaks the inequality constraint.

Therefore, by using the optimization device 10 having the penalty addition unit 13, it is possible to easily handle the inequality constraint as the original linear expression even if the inequality constraint is not transformed into the quadratic form.

As exemplified in FIG. 11, according to the optimization device 10, it is possible to obtain a solution in a wide range for the coefficient λ and the temperature T, as compared with the existing optimization device. Therefore, the inequality constraint may be handled more easily than in a case of the square constraint, and a kind of the problem that may be made to become an operation target may be expanded. That is, an application range of the optimization device 10 may be expanded, and the optimization device 10 may be used to solve more problems.

In the above-described examples, by setting $x_k=0$ and $\Delta E_k = E_{max}$ for $k \in \Omega$, influence on the energy E(x) by the variable $x_k$ is suppressed, but influence on the energy E(x) by the variable $x_k$ may be suppressed by using an asymmetric coupling coefficient as the coefficient $a_{kj}$. The asymmetric coupling coefficient is represented as $a_{kj} \neq 0$, $a_{jk}=0$, as described above. The asymmetric coupling coefficient may be represented as $W_{kj} \neq 0$ and $W_{jk} \neq 0$ by using a symbol W of a weight value between the variables.

That is, the state holding unit 11 may hold the coupling coefficient $a_{ij}$ for a set of the state variable and the inequality constraint variable corresponding to the inequality constraint. The coupling coefficient $a_{ij}$ may be an asymmetric coupling coefficient in which a weight ($a_{kj}$) of the state variable $x_j$ in the local field $h_k$ of the inequality constraint variable $x_k$ ($k \in \Omega$) is set to a value other than 0, and a weight ($a_{jk}$) of the inequality constraint variable $x_k$ in the local field $h_j$ of the state variable $x_j$ is set to 0.

When an asymmetric coupling coefficient is used, even though an inequality constraint variable is selected as an inversion target by the selection unit 14b, influence of the inversion of the variable $x_k$ on the energy E(x) may be suppressed.

Next, another configuration example of the first embodiment will be described. First, an example of an optimization system including the optimization device 10 will be described.

Figure 12:
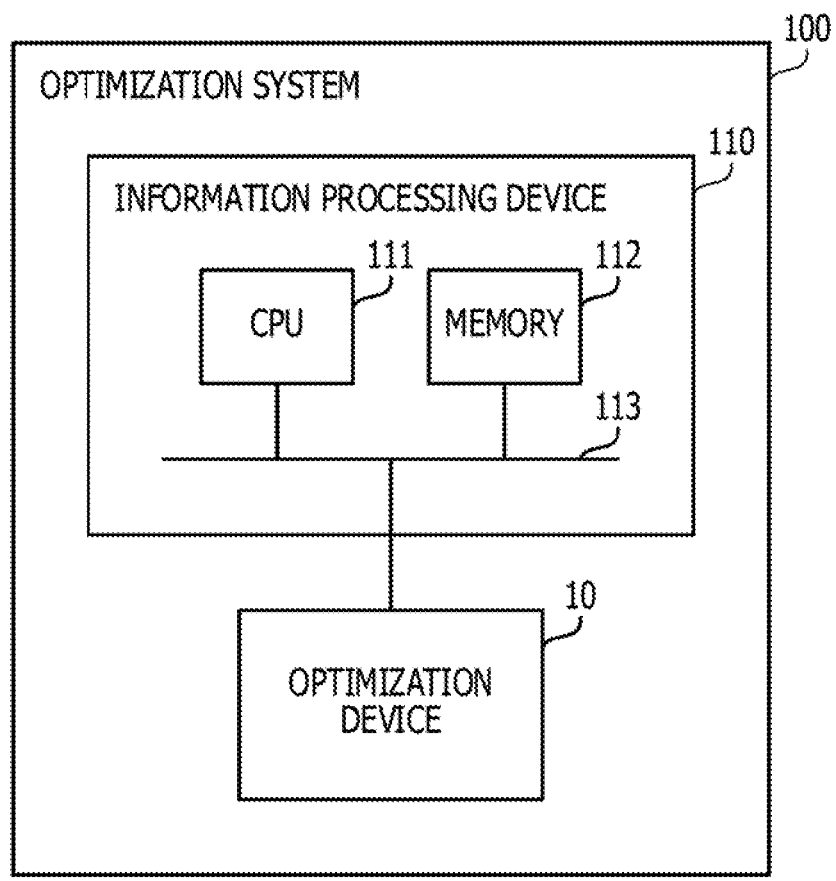
FIG. 12 is a diagram illustrating an example of an optimization system.

FIG. 12 is a diagram illustrating an example of the optimization system.

An optimization system 100 includes the optimization device 10 and an information processing device 110.

The information processing device 110 includes a central processing unit (CPU) 111, a memory 112, and a bus 113.

The CPU 111 is a processor that controls the information processing device 110. The CPU 111 executes a program stored in the memory 112. The memory 112 is, for example, a random-access memory (RAM), and stores a program executed by the CPU 111 and data processed by the CPU 111. The bus 113 is, for example, an internal bus such as Peripheral Component Interconnect Express (PCIe). The CPU 111, the memory 112, and the optimization device 10 are coupled to the bus 113.

The CPU 111 sets the temperature T to the optimization device 10 and receives information on the specified number of times C1 and C2 via the bus 113. In addition, the CPU 111 inputs a constraint identification sign (including an identification code, an upper limit value, and a lower limit value) and the coefficient λ for each inequality constraint to the optimization device 10. The control unit 18 performs setting for the search unit D1 based on the input information thus inputted. For example, a user may set the constraint identification sign or the coefficient λ in the information processing device 110 by operating an input unit (not illustrated) coupled to the information processing device 110.

By doing so, the optimization device 10 is coupled to the information processing device 110 and is used as an accelerator that performs an operation for a combination optimization problem including the inequality constraint at a high speed by hardware.

Next, another circuit configuration example of the optimization device will be described.

Figure 13:
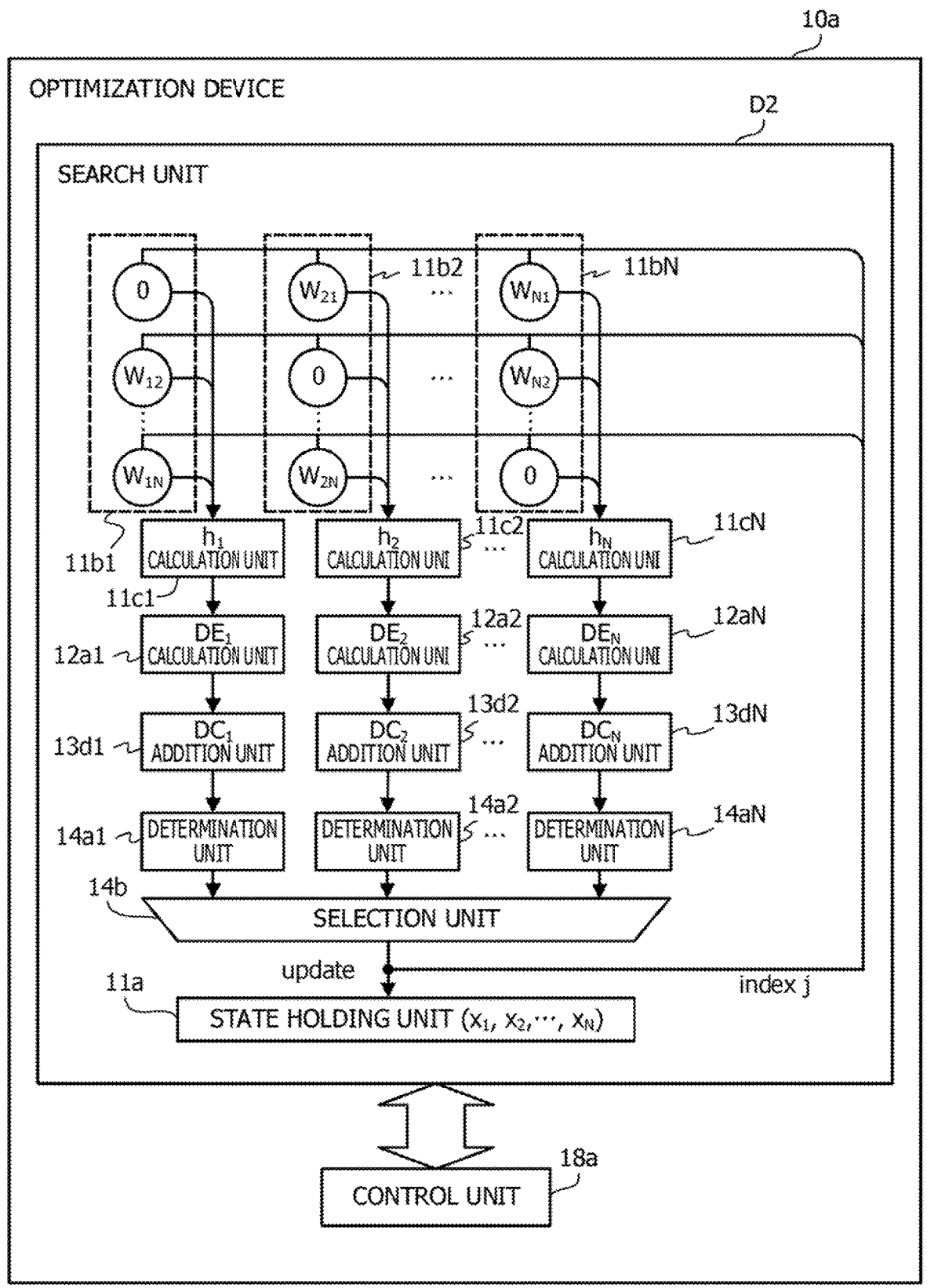
FIG. 13 is a diagram illustrating another circuit configuration example of the optimization device.

FIG. 13 is a diagram illustrating another circuit configuration example of the optimization device.

An optimization device 10a includes a search unit D2 and a control unit 18a. The search unit D2 includes a state holding unit 11a, registers 11b1 to 11bN, h calculation units 11c1 to 11cN, ΔE calculation units 12a1 to 12aN, ΔC addition units 13d1 to 13dN, determination units 14a1 to 14aN, and a selection unit 14b.

Here, in FIG. 13, names of the h calculation units 11c1 to 11cN, the ΔE calculation units 12a1 to 12aN, and the ΔC addition units 13d1 to 13dN are expressed with a subscript i as in the "$h_i$" calculation unit and the like so that corresponding to the state variable of the index i is easily understood. In addition, the state holding unit 11a, the registers 11b1 to 11bN, and the h calculation units 11c1 to 11cN correspond to the state holding unit 11 described above.

The state holding unit 11a holds a state vector. The state holding unit 11a updates the state vector by inverting a value of one state variable among the state vectors, based on an update signal supplied from the selection unit 14b. The update signal indicates an index of the state variable to be inverted.

The register 11b1, the h calculation unit 11c1, the ΔE calculation unit 12a1, the ΔC addition unit 13d1, and the determination unit 14a1 perform operations for a first state variable. The register 11b2, the h calculation unit 11c2, the ΔE calculation unit 12a2, the ΔC addition unit 13d2, and the determination unit 14a2 perform operations for a second spin bit. Likewise, a numerical value i at the end of signs such as "11b1" and "12a1" indicates that an operation corresponding to the state variable of the index i is performed. That is, the search unit D2 includes N sets (a set is one unit of the operation processing circuit that performs an operation for the 1 spin bit, which may be referred to as "neuron") of the register, the h calculation unit, the ΔE calculation unit, the ΔC addition unit, and the determination unit. The N sets perform operations in parallel for the state variables corresponding to the respective sets.

Although the ΔC addition unit in a certain neuron receives a weight value held in a register in another neuron and a local field held by the h calculation unit, signal lines between the ΔC addition unit and the register and the h calculation unit in another neuron are not illustrated.

For example, in the example of the ΔC addition unit 13d1, one or more weight values ($W_{k1}=a_{k1}$) corresponding to the inequality constraint variable $x_k$ ($k \in \Omega$) among $W_{11}$, $W_{21}, \ldots, W_{N1}$ are supplied to the ΔC addition unit 13d1. In addition, among the h calculation units 11c1 to 11cN, one or more local fields ($h_k$) corresponding to the inequality constraint variable $x_k$ are supplied to the ΔC addition unit 13d1. Even if $W_{1i}$ or $h_i$ corresponding to the state variable $x_i$ ($i \in \Psi$) is supplied to the ΔC addition unit 13d1, the ΔC addition unit 13d1 is set to $\Delta C_{i1}=0$ by a control based on the identification code illustrated in FIG. 8.

In addition, in the example of the ΔC addition unit 13d2, one or more weight values ($W_{k2}=a_{k2}$) corresponding to the inequality constraint variable $x_k$ ($k \in \Omega$) among $W_{12}$, $W_{22}, \ldots, W_{N2}$ are supplied to the ΔC addition unit 13d2. In addition, among the h calculation units 11c1 to 11cN, one or more local fields ($h_k$) corresponding to the inequality constraint variable $x_k$ are supplied to the ΔC addition unit 13d2. Even if $W_{i2}$ or $h_i$ corresponding to the state variable $x_i$ ($i \in \Psi$) is supplied to the ΔC addition unit 13d2, the ΔC addition unit 13d2 is set to $\Delta C_{i2}=0$ by a control based on the identification code.

Hereinafter, the register 11b1, the h calculation unit 11c1, the ΔE calculation unit 12a1, the ΔC addition unit 13d1, and the determination unit 14a1 will be mainly exemplified and described. The registers 11b2 to 11bN, the h calculation units 11c2 to 11cN, the ΔE calculation units 12a2 to 12aN, the ΔC addition units 13d2 to 13dN, and the determination unit 14a2 to 14aN, which are configured to have similar names, also have similar functions.

The register 11b1 is a storage unit that stores a weight value $W_{ij}$ (j=1 to N) between the state variable $x_1$ and the other state variables. In addition, for the number N of the state variables, the total number of the weight values is $N^2$. The register 11b1 stores N weight values.

The register 11b1 stores N weight values $W_{11}$, $W_{12}, \ldots, W_{1N}$ for the index 1. $W_{ii}=W_{11}=0$. The register 11a1 outputs the weight value $W_{ij}$ corresponding to the index=j supplied by the selection unit 14b to the h calculation unit 11c1.

The h calculation unit 11c1 calculates the local field $h_i$ based on Equation. 3 and Equation. 4 by using the weight coefficient $W_{ij}$ supplied from the register 11b1. The h calculation unit 11c1 includes a register for holding the local field $h_1$ previously calculated, and updates $h_i$ stored in the register by integrating $\delta h_1^{(j)}$ according to an inversion direction of the state variable indicated by index=j to $h_1$. An initial value of $h_i$ is previously set in the register of the h calculation unit 11c1 according to a problem. In addition, a value of $b_i$ is also set previously in the register of the h calculation unit 11c1 according to the problem. The h calculation unit 11c1 outputs the calculated local field $h_i$ to the ΔE calculation unit 12a1.

The ΔE calculation unit 12a1 calculates $\Delta E_1$ by Equation. 2 based on the local field $h_i$ supplied from the h calculation unit 11c1, and outputs the calculated value to the ΔC addition unit 13d1. Here, the ΔE calculation unit 12a1 calculates $\Delta E_1$ by determining a sign of $h_i$ according to the inversion direction of the state variable $x_1$.

The ΔC addition unit 13d1 calculates a penalty value $\Delta C_1$ according to the change value of the excess amount for the inequality constraint based on Equation. 15, and adds $\Delta C_i$ to $\Delta E_1$ supplied from the ΔE calculation unit 12a1. The ΔC addition unit 13d1 outputs $\Delta E_1 + \Delta C_i$ to the determination unit 14a1.

The determination unit 14a1 outputs the flag $F_1$ indicating inversion propriety to the selection unit 14b based on $\Delta E_1 + \Delta C_1$ supplied from the ΔC addition unit 13d1.

The selection unit 14b selects the index j of the state variable of an inversion target based on the flags $F_1$ to $F_N$ supplied from the determination units 14a1 to 14aN, and supplies the index j to the state holding unit 11a and the registers 11b1 to 11bN. Although the selection unit 14b supplies a flag indicating whether or not the index j of the state variable of the inversion target is selected to the determination units 14a1 to 14aN to prompt generation of an offset value, a signal line through which the flag is supplied is not illustrated.

The control unit 18a sets the temperature T for the determination units 14a1 to 14aN in the search unit D2, controls the number of times of update of the state variables, and inputs the constraint identification signs to the ΔE calculation units 12a1 to 12aN and the ΔC addition units 13d1 to 13dN. The ΔE calculation of the ΔE calculation units 12a1 to 12aN and the ΔC calculation of the ΔC addition units 13d1 to 13dN are controlled by a constraint identification sign as illustrated in FIG. 8.

The optimization device 10a may also efficiently solve the optimization problem including the inequality constraints like the optimization device 10. By using the optimization device 10a, the inequality constraint may be easily handled, and a type of the problem that may be subjected to the operation target may be expanded. That is, an application range of the optimization device 10a may be expanded, and the optimization device 10a may be used to solve more problems.

Second Embodiment

Next, a second embodiment will be described. Items different from the first embodiment described above will be mainly described, and descriptions of the common items will be omitted.

The first embodiment exemplifies a configuration in which the optimization device 10 or the optimization device 10a includes a single search unit. Meanwhile, in an optimization device including a plurality of search units, a configuration for solving an optimization problem by using a replica exchange method is also considered.

Figure 14:
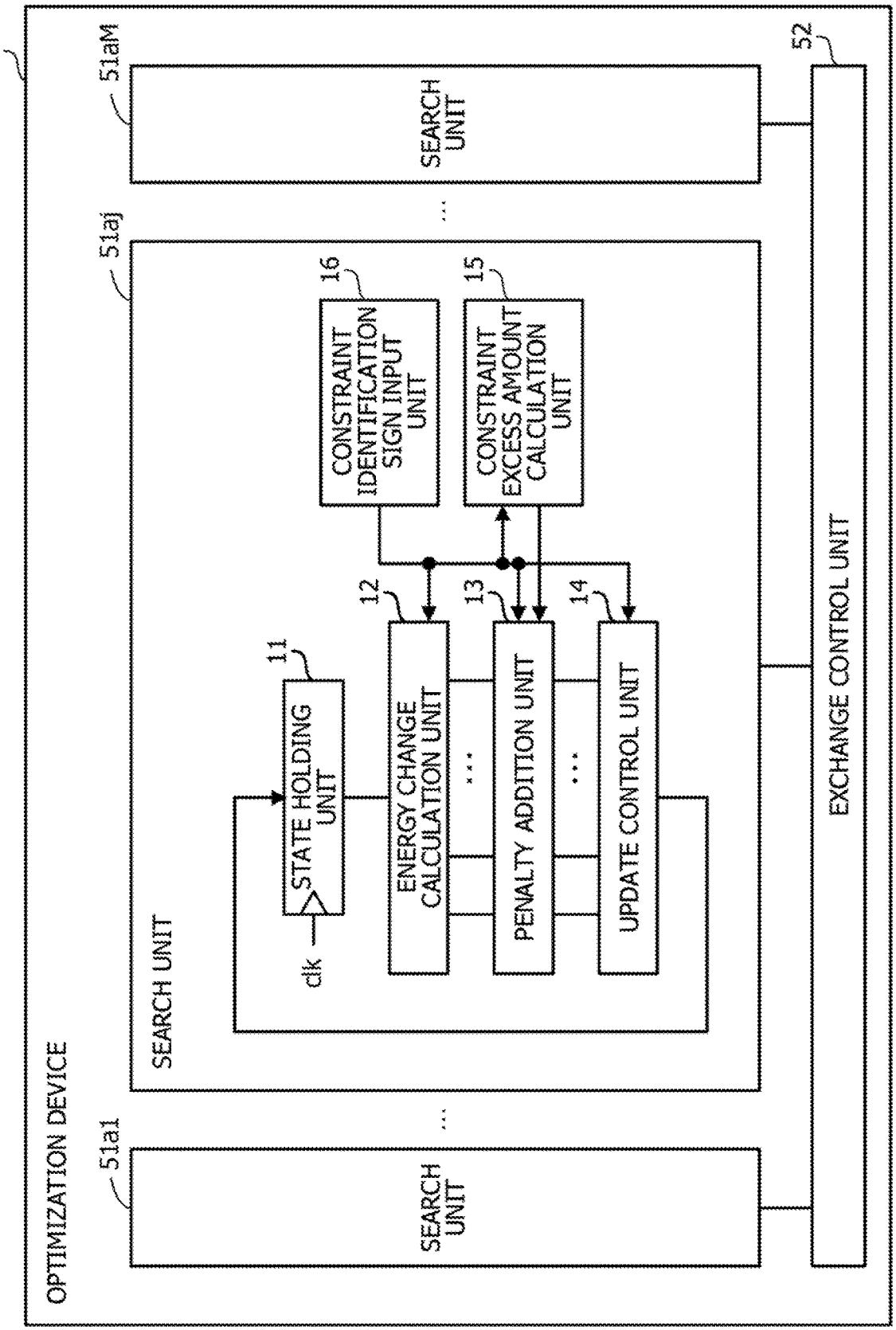
FIG. 14 is a diagram illustrating an example of an optimization device according to a second embodiment.

FIG. 14 is a diagram illustrating an example of the optimization device according to the second embodiment.

An optimization device 50 includes search units 51a1 to 51aM (M (M is an integer greater than or equal to 2) search units) and an exchange control unit 52.

The search units 51a1 to 51aM each have a circuit configuration which is the same as the configuration of the search unit D1 or the search unit D2 according to the first embodiment. FIG. 14 illustrates an example of a search unit 51aj.

The search unit 51aj includes a state holding unit 11, an energy change calculation unit 12, a penalty addition unit 13, an update control unit 14, a constraint excess amount calculation unit 15, and a constraint identification sign input unit 16. Functions of the state holding unit 11, the energy change calculation unit 12, the penalty addition unit 13, the update control unit 14, the constraint excess amount calculation unit 15, and the constraint identification sign input unit 16 are the same as the functions of the elements of a similar name according to the first embodiment, respectively. In addition, the search unit 51aj further includes an energy calculation unit 17 (not illustrated).

The exchange control unit 52 sets different temperature values to the respective search units 51a1 to 51aM, and controls a ground state search based on a replica exchange method by using the search units 51a1 to 51aM. The exchange control unit 52 exchanges temperature values or values of the state variables held in the respective search units between the search units, after reaching the number of repetitions of the ground state search by each of the search units 51a1 to 51aM or after a certain time elapses. For example, it is considered that the exchange control unit 52 exchanges temperatures with a predetermined probability (exchange probability) in a pair of two search units having adjacent temperatures. For example, a probability based on the metropolis method is used as the exchange probability. Alternatively, instead of the temperatures, the exchange control unit 52 may exchange states (values of a plurality of state variables) held by the two search units or local fields corresponding to the respective state variables in the pair of the two search units having adjacent temperatures.

According to the optimization device 50, even when the replica exchange method is used, an optimization problem including an inequality constraint may be efficiently solved. According to the optimization device 50, the inequality constraint may be easily handled, and a type of the problem which may become an operation target may be expanded. An application range of the optimization device 50 may be expanded, and the optimization device 50 may be used for solving more problems.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization system comprising:
an information processing device including a memory and a processor coupled to the memory; and
an optimization device coupled to the information processing device and including a state holding circuit configured to hold values of a plurality of state variables which are used in an Ising-type energy function which represents an energy, an arithmetic circuit configured to:
calculate, as an energy change calculation process, an energy change value when each of the values of the plurality of state variables is set as a next change candidate based on a values of the plurality of state variables and the weight value, in a case where any value of the plurality of state variables changes; and
calculate, as a penalty addition process, a total energy change value by adding a penalty value according to an excess amount violating an inequality constraint, to each of a plurality of the energy change values calculated for the plurality of state variables, the excess amount being calculated based on a coupling coefficient indicating a weight of each of the plurality of state variables in the inequality constraint and a threshold value, and an update control circuit including a plurality of transition propriety determination circuits provided for the respective state variables and a selection circuit and configured to change, as an update control process, any value of the plurality of state variables held in the state holding circuit based on a set temperature T, a random number value, and a plurality of total energy change values,
the plurality of transition propriety determination circuit each includes a sign inversion circuit which inverts a sign of the total energy change value, a first adder which adds an offset to the total energy change value having an inverted sign, a second adder which adds a value corresponding to a thermal noise to an output value from the first adder and a comparator which compares an output value from the second adder with a threshold value,
the selection circuit includes a plurality of selectors coupled in a tree shape over a plurality of stages and a plurality of random number bit generation circuits provided for the respective stages, first selectors in a first stage of the plurality of stages each receives a pair of output values from the plurality of transition propriety determination circuits, second selectors in a second stage of the plurality of stages each receives a pair of output values from the first selectors and a last selector in a last stage of the plurality of stages receives a pair of output signals from two selectors in a stage provided one step before the last stage and outputs an output value as the any value of the plurality of state variables.

2. The optimization system according to claim 1, wherein the arithmetic circuit calculates the penalty value by multiplying a change value of the excess amount calculated based on the coupling coefficient and the threshold value by an importance coefficient indicating importance of the inequality constraint.

3. The optimization system according to claim 1, wherein, when the inequality constraint is an inequality constraint for an upper limit constraint value, the arithmetic circuit adds a first penalty value according to a change value of a first excess amount, which is calculated based on a first coupling coefficient and a first threshold value, in a positive direction in which a number increases with respect to the first threshold value, to each of the plurality of energy change values.

4. The optimization system according to claim 1, wherein, when the inequality constraint is an inequality constraint for a lower limit constraint value, the arithmetic circuit adds a second penalty value according to a change value of a second excess amount, which is calculated based on a second coupling coefficient and a second threshold value, in a negative direction in which a number decreases with respect to the second threshold value, to each of the plurality of energy change values.

5. The optimization system according to claim 1, wherein, when the inequality constraint is an inequality constraint for an upper limit constraint value and a lower limit constraint value, the arithmetic circuit adds a third penalty value according to a larger change value between a change value of a third excess amount, which is calculated based on a third coupling coefficient and a third threshold value, in a positive direction in which a number increases with respect to the third threshold value, and a change value of a fourth excess amount, which is calculated based on the third coupling coefficient and a fourth threshold value smaller than the third threshold value, in a negative direction in which a number decreases with respect to the fourth threshold value, to each of the plurality of energy change values.

6. The optimization system according to claim 1, wherein the memory holds the coupling coefficient for a set of a state variable and an inequality constraint variable corresponding to the inequality constraint, and wherein the coupling coefficient is an asymmetric coupling coefficient in which a weight of the state variable in a local field of the inequality constraint variable is set to a value other than 0 and a weight of the inequality constraint variable in a local field of the state variable is set to 0.

7. The optimization system according to claim 1, wherein the arithmetic circuit calculates an energy value corresponding to values of the plurality of state variables held in the state holding circuit by accumulating the energy change value.

8. The optimization system according to claim 1, wherein a plurality of circuits each including the memory and the arithmetic circuit are provided and temperature values different from each other are set to the plurality of circuits respectively and the temperature values or the values of the plurality of state variables after reaching a number of repetitions of a ground state search by each of the circuits or after a certain time elapses are exchanged between the plurality of circuits.

9. The optimization system according to claim 1, wherein the update control circuit calculates, as the update control process, a transition acceptance probability (A) that accepts a change in the any value of the plurality of state variables for the energy change value using a following equation (5) using a Metropolis method or a Gibbs method:

$$A(\Delta E) = \begin{cases} \min[1, \exp(-\beta \cdot \Delta E)] & \text{Metropolis} \\ 1/[1 + \exp(\beta \cdot \Delta E)] & \text{Gibbs} \end{cases} \quad (5)$$

where $\Delta E$ is the energy change value, $\beta$ is a reciprocal of the set temperature T, and allows a change in the any value of the plurality of state variables for the total energy change value when the total energy change value satisfies a following equation (8):

$$\ln(u) \times T \leq -(\Delta E + \Delta C) \quad (8)$$

where u is the random number value, $\Delta C$ is the penalty value and $(\Delta E + \Delta C)$ is the total energy change value.

10. The optimization system according to claim 1, wherein the Ising-type energy function is represented by a following equation (1), $$E(x) = -\sum_{\langle i,j \rangle} W_{ij} x_i x_j - \sum_i b_i x_i \quad (1)$$

where $x_i$ is an i-th state variable, $x_j$ is a j-th state variable, Wij is a weight value between $x_i$ and $x_j$ and bi is a bias value for $x_i$.

11. The optimization system according to claim 10, wherein the energy change value $\Delta E$ is calculated using following equations (2), (3) and (4), $$\Delta E_i = E(x)|_{x_i \to 1-x_i} - E(x) \quad (2)$$
$$= -\delta x_i \left( \sum_j W_{ij} x_j + b_i \right),$$
$$= -\delta x_i h_i$$
$$= \begin{cases} -h_i & \text{for } x_i = 0 \to 1 \\ +h_i & \text{for } x_i = 1 \to 0 \end{cases}$$

$$h_i = \sum_j W_{ij} x_j + b_i, \text{ and} \quad (3)$$

$$\delta h_i^{(j)} = \begin{cases} +W_{ij} & \text{for } x_j = 0 \to 1 \\ -W_{ij} & \text{for } x_j = 1 \to 0 \end{cases}. \quad (4)$$

* * * * *